(12) United States Patent
Stoeckli et al.

(10) Patent No.: US 11,150,741 B1
(45) Date of Patent: *Oct. 19, 2021

(54) HYBRID SWITCH FOR AN INPUT DEVICE

(71) Applicant: Logitech Europe S.A., Lausanne (CH)

(72) Inventors: Jan Stoeckli, Jongny (CH); Nicolas Ramond, Lurgrin (FR); Olivier Egloff, Renens (CH); Regis Croisonnier, Lausanne (CH); Laurent Plancherel, Lausanne (CH)

(73) Assignee: Logitech Europe S.A., Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/094,638

(22) Filed: Nov. 10, 2020

(51) Int. Cl.
    *G06F 3/023*     (2006.01)
    *G06F 3/02*     (2006.01)
    *G06F 3/0354*     (2013.01)

(52) U.S. Cl.
    CPC ............ *G06F 3/023* (2013.01); *G06F 3/0202* (2013.01); *G06F 3/03541* (2013.01)

(58) Field of Classification Search
    CPC .... G06F 3/023; G06F 3/03541; G06F 3/0202; H01H 13/14
    See application file for complete search history.

(56) References Cited

U.S. PATENT DOCUMENTS

| 2009/0091536 A1* | 4/2009 | Callaghan | G06F 3/023 345/168 |
| 2013/0063286 A1* | 3/2013 | Elias | H03K 17/9622 341/33 |
| 2013/0141342 A1* | 6/2013 | Bokma | G06F 3/0202 345/173 |
| 2017/0084406 A1* | 3/2017 | Wang | H01H 13/14 |
| 2017/0115747 A1* | 4/2017 | Chen | G06F 3/0304 |
| 2018/0019075 A1* | 1/2018 | Asento | H01H 9/0228 |
| 2019/0393006 A1 | 12/2019 | Tsai et al. | |
| 2020/0012354 A1 | 1/2020 | Cho | |

OTHER PUBLICATIONS

U.S. Appl. No. 17/094,640, Notice of Allowance, dated Mar. 5, 2021, 10 pages.

* cited by examiner

*Primary Examiner* — Amit Chatly
(74) *Attorney, Agent, or Firm* — Kilpatrick Townsend & Stockton LLP

(57) ABSTRACT

An input device comprises a depressible element with two switches including a first switch configured to generate a first signal when the depressible element is depressed by a threshold distance and a second switch configured to generate a second signal indicating when the depressible element is depressed by the threshold distance and the second switch is in an active state. One or more processors may be configured to receive the first signal from the first switch; configure the second switch to change from an inactive state to an active state in response to receiving the first signal; receive the second signal from the second switch in the active state; determine whether the second signal indicates that the depressible element is depressed by the threshold distance; and generate event data confirming that the depressible element is depressed by the threshold distance in response to receiving the second signal.

20 Claims, 16 Drawing Sheets

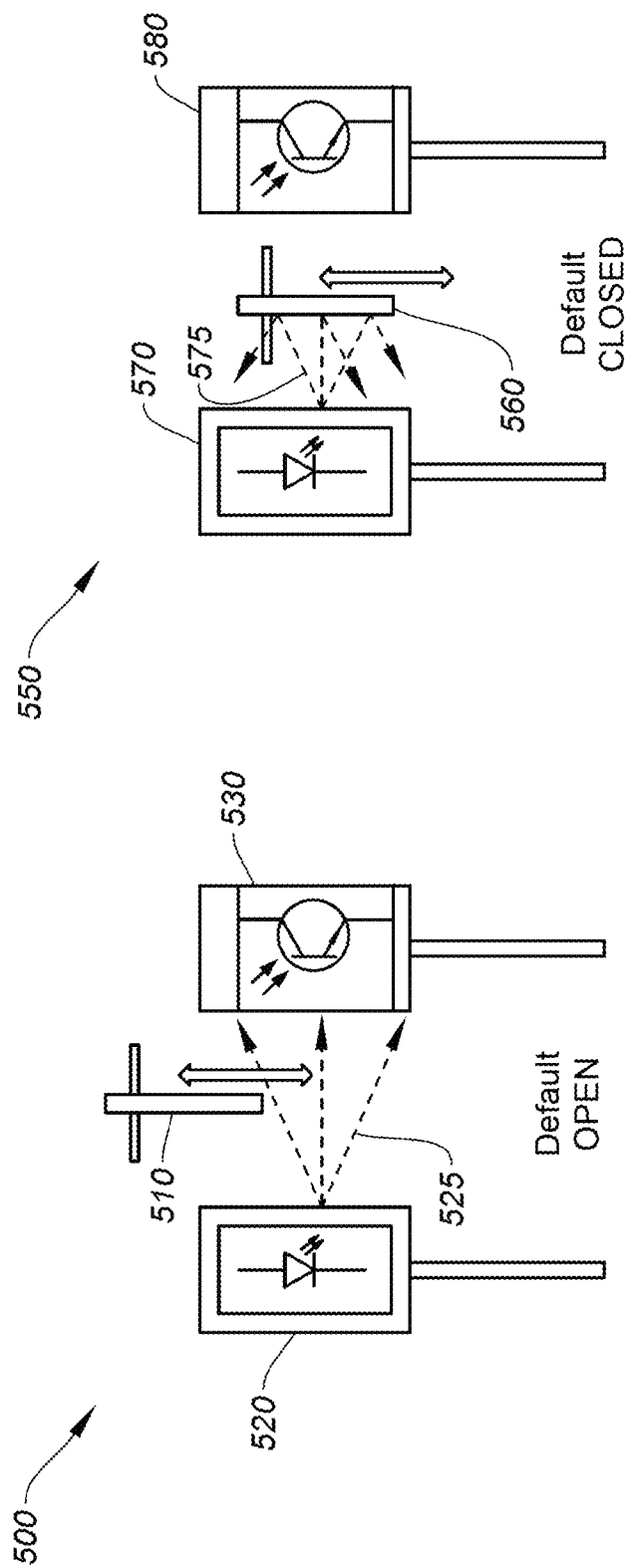

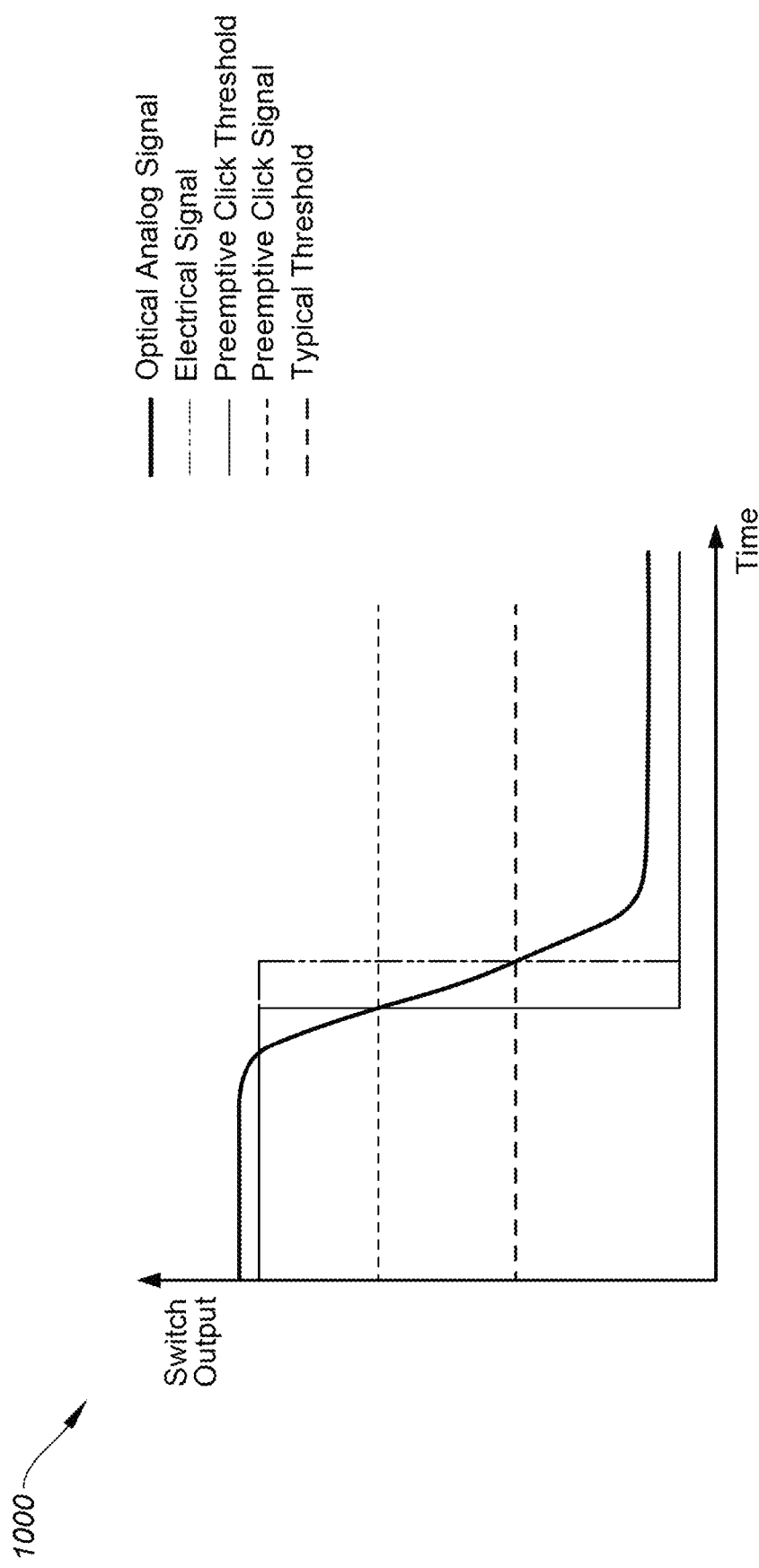

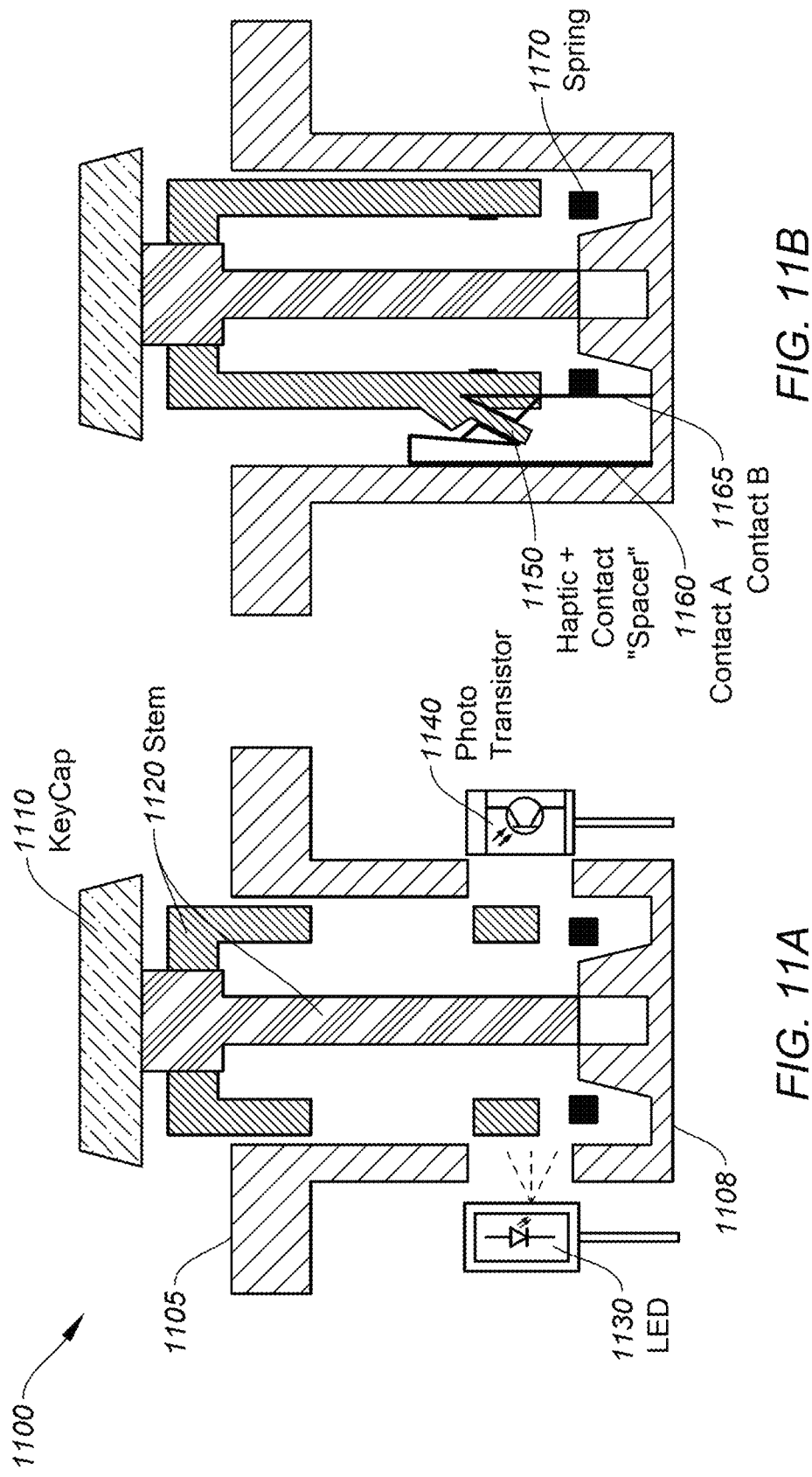

HYBRID SWITCH FOR AN INPUT DEVICE

BACKGROUND

Input devices are commonplace in modern society and are typically used to convert human-induced analog inputs (e.g., touches, clicks, motions, touch gestures, button presses, scroll wheel rotations, etc.) made in conjunction with an input device into digital signals for computer processing. An input device can include any device that can provide data and control signals to a computing system. Some non-limiting examples of input devices include computer mice, keyboards, virtual reality and/or augmented reality controllers, touch pads, remote controls, gaming controllers, joysticks, trackballs, and the like. Some non-limiting examples of computing systems include desktop computers, laptop computers, netbook computers, gaming consoles, tablets and "phablet" computers, smart phones, personal digital assistants, wearable devices (e.g., smart watches, glasses), virtual reality (VR) and/or augmented reality (AR) headsets and systems, and the like.

Input devices have undergone many marked improvements over the last several decades. In some contemporary input devices, such as computer mice and keyboards, buttons and/or keys often employ contact-based switches for click detection. Contact-based switches have been in the market for many years and have significantly improved in quality and price, but are subject to wear-and-tear over extended use due to repeated contact-based actuation. This can often result in unreliable performance characteristics and low signal-to-noise ratios that would be unacceptable to even casual users, much less those in the more discerning gaming community. As such, better solutions are needed.

Unless otherwise indicated herein, the materials described in this section are not prior art to the claims in this application and are not admitted to be prior art by inclusion in this section.

BRIEF SUMMARY

In some embodiments, an input device comprises one or more processors, a depressible element including two switches including a first switch configured to generate a first signal when the depressible element is depressed by a threshold distance and a second switch configured to generate a second signal indicating when the depressible element is depressed by the threshold distance and the second switch is in an active state. The one or more processors can be communicatively coupled to the first switch and the second switch and configured to receive the first signal from the first switch, configure the second switch to change from an inactive state to an active state in response to receiving the first signal, receive the second signal from the second switch in the active state, determine whether the second signal indicates that the depressible element is depressed by the threshold distance, and generate event data confirming that the depressible element is depressed by the threshold distance in response to receiving the second signal indicating that the depressible element is depressed by the threshold distance. In some embodiments, the first switch is an electric or galvanic contact-based switch and the second switch is a contactless switch including one of an optical, capacitive, inductive, piezo, or magnetic contactless switch. In some aspects, the second switch is configured to change from an inactive state to an active state in response to receiving a first rising edge of the first signal.

In certain embodiments, when the second switch is in the active state, the second switch operates in a first power mode and the second switch is configured to continuously or intermittently detect whether the depressible element is depressed by the threshold distance, when the second switch is in the inactive state, the second switch operates in a second power mode and the second switch does not detect whether the depressible element is depressed by the threshold distance. Typically, the second switch consumes at least 90% more power when in the first power mode than when in the second power mode. When in the active state, the second switch detects whether the depressible element is depressed by the threshold distance at a frequency of at least 1 kHz. The second switch can be in the inactive state by default until switched to the active state in response to the one or more processors receiving the first signal. In some cases, the one or more processors cause the second switch to switch from the active state to the inactive state after a threshold time of inactivity where the depressible element is not depressed. The input device can be a computer mouse wherein the depressible element is a button on the computer mouse, a keyboard wherein the depressible element is a key on the keyboard, or other suitable input device (e.g., game controller, remote control, medical device controller, etc.).

In some embodiments, a method of operating an input device can include: receiving a first signal from a first switch of the input device, the first switch configured to generate the first signal when a depressible element of the input device is depressed by a threshold distance; configuring a second switch of the input device to change from an inactive state to an active state in response to receiving the first signal; receiving a second signal from the second switch when the second switch is in the active state, the second signal indicating whether the depressible element is depressed by the threshold distance; determining whether the second signal indicates that the depressible element is depressed by the threshold distance; and generating event data confirming that the depressible element is depressed by the threshold distance in response to receiving the second signal that indicates that the depressible element is depressed by the threshold distance. The first switch can be an electric or galvanic contact-based switch and the second switch can be one of an optical, capacitive, inductive, piezo, or magnetic contactless switch. The second switch may be configured to change from an inactive state to an active state in response to receiving a first rising edge of the first signal. When the second switch is in the active state, the second switch can operate in a first power mode and the second switch is configured to continuously or intermittently detect whether the depressible element is depressed by the threshold distance, when the second switch is in the inactive state, the second switch operates in a second power mode and the second switch does not detect whether the depressible element is depressed by the threshold distance, and the second switch consumes at least 90% more power when in the first power mode than when in the second power mode. When in the active state, the second switch may detect whether the depressible element is depressed by the threshold distance at a frequency of at least 1 kHz. In some cases, the second switch is in the inactive state by default until switched to the active state in response to receiving the first signal. The second switch may switch from the active state to the inactive state after a threshold time of inactivity where the depressible element is not depressed. The input device can be a computer mouse where the depressible element is a button on the computer mouse, a keyboard where the depressible element is a key on the keyboard, or other suitable input device including medical devices, internet-of-things devices, gaming devices, home entertainment devices, fitness devices, or any suitable input device with input elements that can be configured to incorporate the myriad hybrid switch implementations described herein.

In further embodiments, an input device can include a housing and a depressible element coupled to the housing, the depressible element having two switches including a first switch configured to generate a first signal when the depressible element is depressed by a threshold distance and a second switch configured to generate a second signal indicating whether the depressible element is depressed by the threshold distance when the second switch is in an active state. The input device can further include one or more processors disposed in the housing and communicatively coupled to the first switch and the second switch, the one or more processors configured to receive the first signal from the first switch, configure the second switch to change from an inactive state to an active state in response to receiving the first signal, receive the second signal from the second switch in the active state, determine whether the second signal indicates that the depressible element is depressed by the threshold distance, generate event data confirming that the depressible element is depressed by the threshold distance in response to receiving the second signal that indicates that the depressible element is depressed by the threshold distance, generate an interrupt signal in response to the second signal indicating that the depressible element is depressed by the threshold distance, and in response to receiving the interrupt signal, cause the input device to include the event data on a next periodic input device report regardless of whether the event data is generated before or after a periodic switch status check, the periodic switch status check occurring once before each successive input device report. The first switch can be an electric or galvanic contact-based switch, and the second switch can be one of an optical, capacitive, inductive, piezo, or magnetic contactless switch. The second switch can be configured to change from an inactive state to an active state in response to receiving a first rising edge of the first signal. The input device is communicatively coupled to a host computing device, and the input device report is generated and sent to the host computing device at 1 ms intervals. The second switch can be in the inactive state by default until switched to the active state in response to the one or more processors receiving the first signal. The input device can be a computer mouse where the depressible element is a button on the computer mouse, a keyboard where the depressible element is a key on the keyboard, or other suitable input device including medical devices, internet-of-things devices, gaming devices, home entertainment devices, fitness devices, or any suitable input device with input elements that can be configured to incorporate the myriad hybrid switch implementations described herein.

In some embodiments, a method of operating an input device includes: receiving a first signal from a first switch of the input device, the first switch configured to generate the first signal when a depressible element of the input device is depressed by a threshold distance; configuring a second switch of the input device to change from an inactive state to an active state in response to receiving the first signal; receiving a second signal from the second switch when the second switch is in the active state, the second signal indicating whether the depressible element is depressed by the threshold distance; determining whether the second signal indicates that the depressible element is depressed by the threshold distance; generating event data confirming that the depressible element is depressed by the threshold distance in response to receiving the second signal that indicates that the depressible element is depressed by the threshold distance; generating an interrupt signal in response to the second signal indicating that the depressible element is depressed by the threshold distance; and in response to receiving the interrupt signal, causing the input device to include the event data on a next periodic input device report regardless of whether the event data is generated before or after a periodic switch status check, the periodic switch status check occurring once before each successive input device report. In some embodiments, the first switch is an electric or galvanic contact-based switch and the second switch is one of an optical, capacitive, inductive, piezo, or magnetic contactless switch and can be configured to change from an inactive state to an active state in response to receiving a first rising edge of the first signal. In some aspects, the second switch is in the inactive state by default until switched to the active state in response to receiving the first signal.

In certain embodiments, an input device comprises one or more processors and a depressible element including two switches including a first switch configured to generate a first signal when activated and a second switch configured to generate a second signal when activated. The one or more processors can be communicatively coupled to the first switch and the second switch and the one or more processors can be configured to: receive the first signal from the first switch indicating that the first switch is activated in response to the depressible element being depressed by a threshold distance; determine a first position of the depressible element when the first signal is received, the first position of the depressible element corresponding to the threshold distance; calibrate a first activation threshold for the second switch based on the first position of the depressible element when the first signal is received, the first activation threshold causing the second switch to generate the second signal when the depressible element is depressed to the first position corresponding to the threshold distance; determine a second activation threshold for the second switch, the second activation threshold corresponding to a second position of the depressible element that causes the second switch to generate the second signal, wherein the second position is between the first position and a position of the depressible element when at rest and not being depressed; and cause the second switch to switch from the first activation threshold to the second activation threshold. In some aspects, the first switch is an electric or galvanic contact-based switch and the second switch is one of an optical, capacitive, inductive, piezo, or magnetic contactless switch. The one or more processors can be further configured to receive an input from a user corresponding to a selection of second activation threshold for the second switch, wherein the determining of the second activation threshold is based on the input from the user. The input device can be a computer mouse where the depressible element is a button on the computer mouse, a keyboard where the depressible element is a key on the keyboard, or other suitable input device including medical devices, internet-of-things devices, gaming devices, home entertainment devices, fitness devices, or any suitable input device with input elements that can be configured to incorporate the myriad hybrid switch implementations described herein.

In some embodiments, a method of operating an input device comprises: receiving a first signal from a first switch of the input device, the first switch configured to generate the first signal when a depressible element of the input device is depressed by a threshold distance; determining a first position of the depressible element when the first signal is received, the first position of the depressible element corresponding to the threshold distance; calibrating a first activation threshold for a second switch based on the first position of the depressible element when the first signal is received, the first activation threshold causing the second switch to generate a second signal when the depressible element is depressed to the first position corresponding to the threshold distance; determining a second activation threshold for the second switch, the second activation threshold corresponding to a second position of the depressible element that causes the second switch to generate the second signal, wherein the second position is between the first position and a position of the depressible element when at rest and not being depressed; and causing the second switch to switch from the first activation threshold to the second activation threshold. In some aspects, the first switch is an electric or galvanic contact-based switch, and the second switch is one of an optical, capacitive, inductive, piezo, or magnetic contactless switch. The method can further comprise receiving an input from a user corresponding to a selection of second activation threshold for the second switch, where the determining of the second activation threshold is based on the input from the user. The input device can be a computer mouse where the depressible element is a button on the computer mouse, a keyboard where the depressible element is a key on the keyboard, or other suitable input device including medical devices, internet-of-things devices, gaming devices, home entertainment devices, fitness devices, or any suitable input device with input elements that can be configured to incorporate the myriad hybrid switch implementations described herein.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which:

FIG. 5A shows an example of an operation of an optical switch sensor with a default open configuration, according to certain embodiments.

FIG. 5B shows an example of an operation of an optical switch sensor with a default closed configuration, according to certain embodiments.

FIG. 10A is a simplified timing diagram showing aspects of generating preemptive inputs on an input device using a hybrid switch, according to certain embodiments.

FIG. 11A-11B show a cross-section of a keyboard key implementation utilizing an optical-based hybrid switch, according to certain embodiments.

Throughout the drawings, it should be noted that like reference numbers are typically used to depict the same or similar elements, features, and structures.

DETAILED DESCRIPTION

Figure 1:
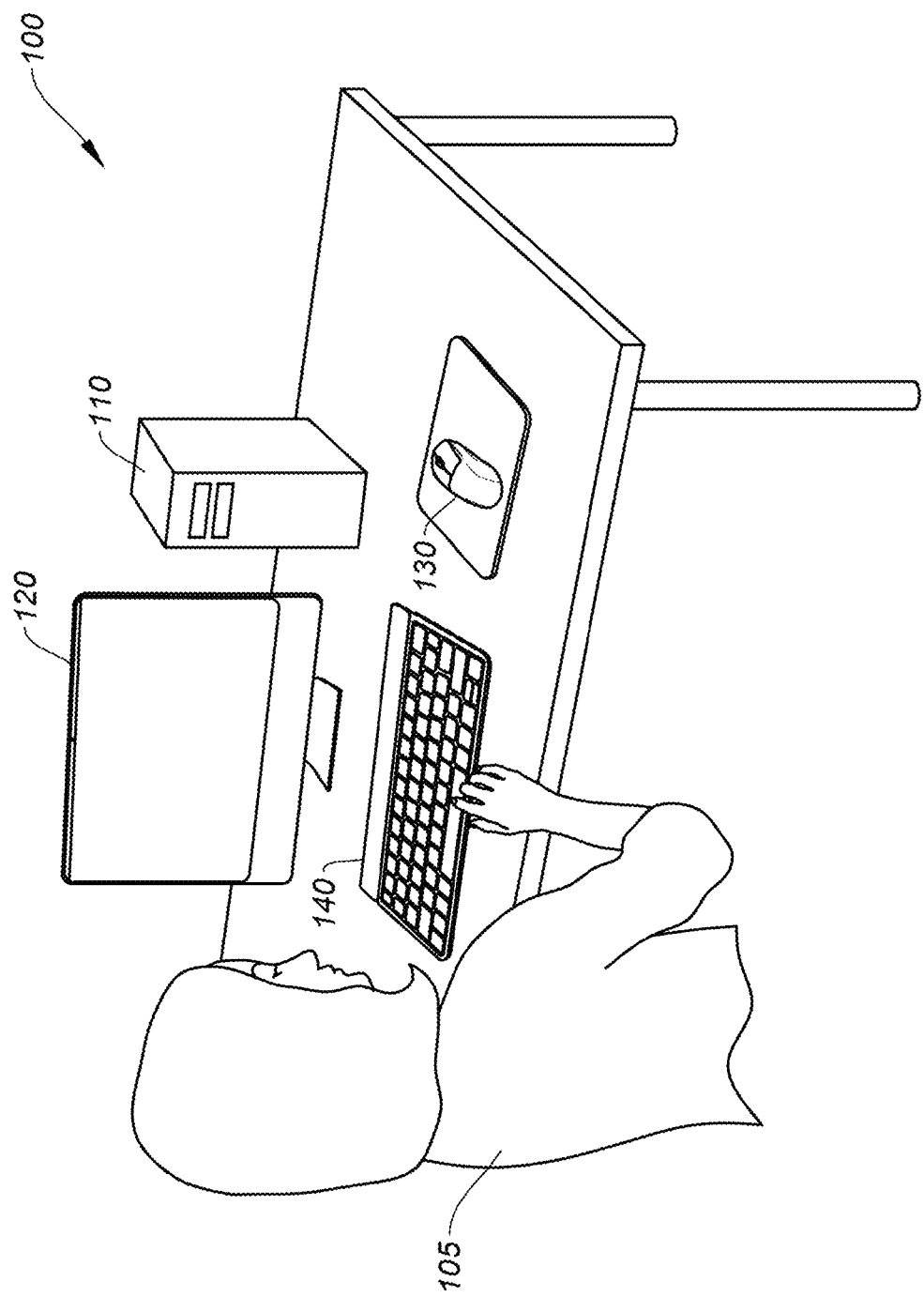
FIG. 1 shows an example of a computer system that can include any of a variety of host computing devices and computer peripheral devices, including computer peripheral devices (e.g., a computer mouse, keyboard, etc.) that can be configured to perform aspects of the various inventive concepts described herein.

Aspects of the present disclosure relate generally to electronic devices, and more particularly to computer peripheral devices that utilize a hybrid switch implementation for improved performance characteristics, according to certain embodiments.

In the following description, various examples of devices utilizing hybrid switch technologies are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

The following high level summary is intended to provide a basic understanding of some of the novel innovations depicted in the figures and presented in the corresponding descriptions provided below. Aspects of the invention relate to various improved computer peripheral devices and electronic devices more generally (also referred to as input devices) that incorporate hybrid switches, as described in the embodiments that follow.

An input device, as noted above, is typically used to convert human-induced analog inputs (e.g., touches, clicks, motions, touch gestures, button presses, scroll wheel rotations, etc.) made in conjunction with the input device into digital signals for computer processing. A button (e.g., used in a computer mouse, remote control, game controller, etc.) or key (e.g., used on a keyboard) are common depressible elements that can be depressed by a user to instantiate a type of control signal (e.g., an alphanumeric character, a left/right mouse button, a trigger, etc.). For a button, in many contemporary computer mice, the button "click" detection is typically based on a type of contact-based switch, such as a galvanic or electric switch, where a physical contact between two elements causes the input device to generate a control signal (e.g., a button click). These types of switches have been used for many decades and, through continued innovation, have seen improvements in longevity, reliability, and price. However, contact-based switches (see, e.g., FIG. 4A) are still susceptible to inevitable wear-and-tear as the contacts mechanically or chemically wear out, resulting in poor quality, noisy signals (see, e.g., FIGS. 4B-4C). Some contemporary input devices have incorporated contactless switches (e.g., optical switches—see, e.g., FIGS. 5A-5B). Although these types of switches provide better reliability and longevity as compared to contact-based switches, they can consume significantly more current (e.g., 5-6 mA) even when not being operated (depressed). While there have been improvements in their operating efficiency, contactless switches, and particularly optical switches, regularly consume significantly more power than basic contact-based switches, which consume comparatively negligible current, and particularly when not activated (e.g., not making contact).

Certain embodiments are directed to a hybrid adaptation of two (or more) switches (see, e.g., FIG. 6) to achieve improved performance, power efficiency, reliability, longevity, as well as additional functionality that would not be practical in single switch implementations. In some aspects, the contact-based switch is used while the input device is in a low power mode. The contact-based switch can be used to "wake" the input device (e.g., change modes from a low power "sleep" or "inactive" mode to a high power "active" mode) with negligible battery consumption. When the contacts of the contact-based switch inevitably begins to wear out it will still generate a signal, but with deleterious effects (see, e.g., FIG. 4C). However, because the signal is only used to wake the input device, the noisy signal can reliably be used. The contactless switch (e.g., optical switch) can be used in the high power mode, thus the input device benefits from the lower power characteristics of the contact-based switch when in low power mode, and only uses the contactless switch (e.g., optical switch) and its higher power requirement when in an active mode. The hybrid combination of the two switches presents many additional advantages and smart functionality. For instance, in addition to the significant power savings (see also, FIG. 8), other improvements in input device report latency (see, e.g., FIG. 9A-9D), preemptive triggering ("preemptive clicking"—see, e.g., FIGS. 10A-10B), and pre-fail detection are possible. While many of the embodiments presented herein are directed to a button (e.g., left or right mouse button) computer mouse, the novel concepts provided herein can be applied to any input device. For example, hybrid-switch keyboard implementations are presented in FIGS. 11A-12B.

It is to be understood that this high level summary is presented to provide the reader with a baseline understanding of some of the novel aspects of the present disclosure and a roadmap to the details that follow. This high level summary in no way limits the scope of the various embodiments described throughout the detailed description and each of the figures referenced above are further described below in greater detail and in their proper scope.

FIG. 1 shows an example of a computer system 100 that can include any of a variety of host computing devices and computer peripheral devices, including computer peripheral devices (e.g., a computer mouse, keyboard, etc.) that can be configured to perform aspects of the various inventive concepts described herein. Computer system 100 shows a user 105 operating a host computing device (shown as a desktop computer) 110 and a number of computer peripheral devices communicatively coupled to and integrated with the host computing device, including a display device 120, a computer mouse 130, a keyboard 140, and may include any other suitable input device. Each computer peripheral device 120-140 can be communicatively coupled to host computing device 110.

Although the host computing device is shown as a desktop computer, other types of host computing devices can be used including gaming systems, laptop computers, set top boxes, entertainment systems, tablet or "phablet" computers, stand-alone head mounted displays ("HMD"), or any other suitable host computing device (e.g., smart phone, smart wearable, or the like). In some cases, multiple host computing devices may be used and one or more of the computer peripheral devices may be communicatively coupled to one or both of the host computing devices (e.g., a computer mouse may be coupled to multiple host computing devices). A host computing device may also be referred to herein as a "host computer," "host device," "computing device," "computer," or the like, and may include a machine readable medium (not shown) configured to store computer code, such as driver software, firmware, and the like, where the computer code may be executable by one or more processors of the host computing device(s) to control aspects of the host computing device, for instance via the one or more computer peripheral devices.

A typical computer peripheral device can include any suitable input device, output device or input/output device including those shown (e.g., a computer mouse) and not shown (e.g., remote control, wearables (e.g., gloves, watch, head mounted display), AR/VR controller, CAD controller, joystick, simulation shifter, stylus device, or other suitable device that can be used, for example, to convert analog inputs into digital signals for computer processing. By way of example, a computer peripheral device (e.g., computer mouse 130) can be configured to provide control signals for movement tracking (e.g., x-y movement on a planar surface, three-dimensional "in-air" movements, etc.), touch and/or gesture detection, lift detection, orientation detection (e.g., in 3 degrees-of-freedom (DOF) system, 6 DOF systems, etc.), power management capabilities, input detection (e.g., buttons, scroll wheels, etc.), output functions (e.g., LED control, haptic feedback, etc.), or any of myriad other features that can be provided by a computer peripheral device, as would be appreciated by one of ordinary skill in the art. The buttons of computer mouse 130 and the keys of keyboard 140 (or other depressible element on any input device) may incorporate hybrid switch architectures, as presented herein.

An input device may be a computer peripheral device, and may be referred to as either herein, as well as a "peripheral input device," "peripheral," or the like. The majority of the embodiments described herein generally refer to computer peripheral devices 130-140, however it should be understood that a computer peripheral device can be any suitable input/output (I/O) device (e.g., user interface device, control device, input unit, or the like) that may be adapted to utilize the novel embodiments described and contemplated herein.

A System for Operating a Computer Peripheral Device

Figure 2:
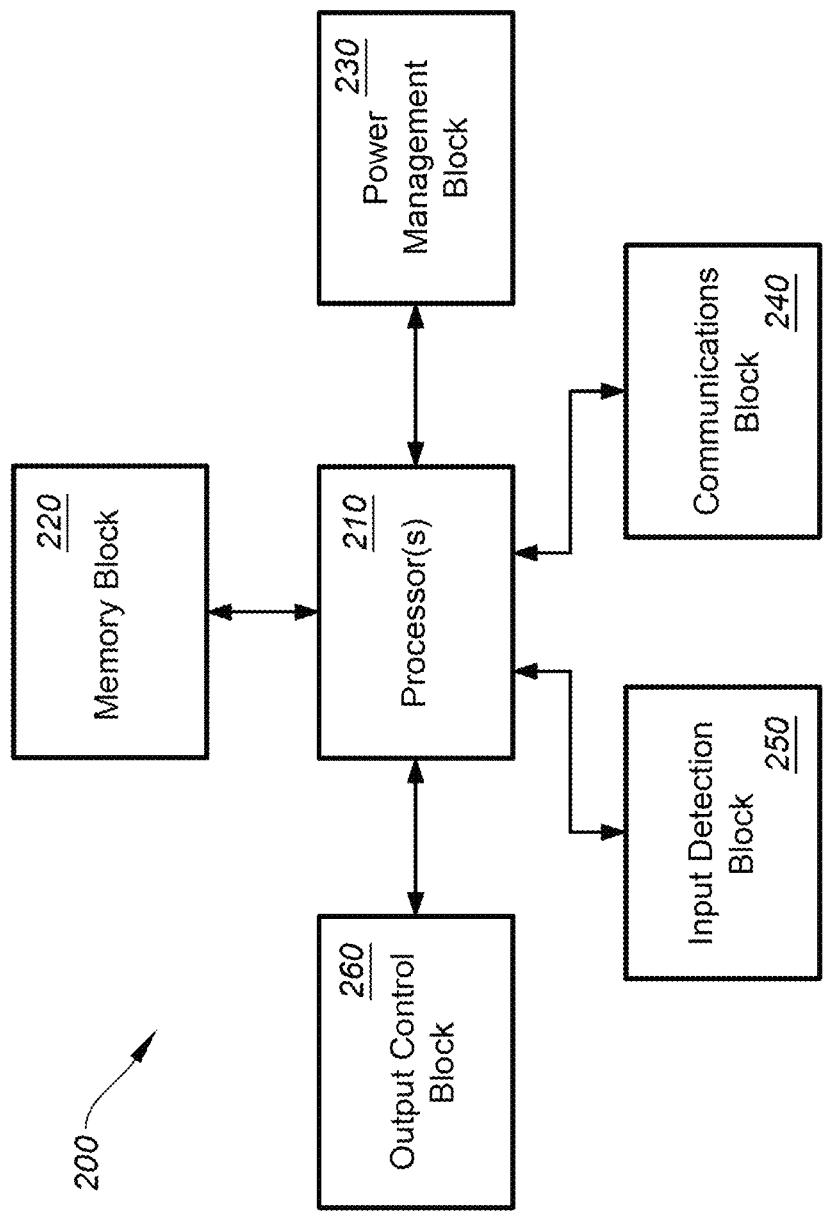
FIG. 2 shows a simplified block diagram of a system configured for operating an input device, according to certain embodiments.

FIG. 2 shows a system 200 for operating a computer peripheral device (e.g., computer mouse 130, keyboard 140, etc.), according to certain embodiments. System 200 may be configured to operate any of the computer peripheral devices specifically shown or not shown herein but within the wide purview of the present disclosure. System 200 may include processor(s) 210, memory 220, a power management system 230, a communication module 240, an input detection module 250, and an output control module 260. Each of the system blocks 220-260 can be in electronic communication with processor(s) 210 (e.g., via a bus system). System 200 may include additional functional blocks that are not shown or discussed to prevent obfuscation of the novel features described herein. System blocks 220-260 (also referred to as "modules") may be implemented as separate modules, or alternatively, more than one system block may be implemented in a single module. In the context described herein, system 200 can be incorporated into any input device described or mentioned herein and may be further configured with any of the hybrid switch implementations presented herein, as described below at least with respect to FIGS. 6-12B, as would be appreciated by one of ordinary skill in the art with the benefit of this disclosure.

In certain embodiments, processor(s) 210 may include one or more microprocessors and can be configured to control the operation of system 200. Alternatively or additionally, processor(s) 210 may include one or more microcontrollers (MCUs), digital signal processors (DSPs), or the like, with supporting hardware and/or firmware (e.g., memory, programmable I/Os, etc.), and/or software, as would be appreciated by one of ordinary skill in the art. Processor(s) 210 can control some or all aspects of the operation of computer peripheral device 150 (e.g., system block 220-260). Alternatively or additionally, some of system blocks 220-260 may include an additional dedicated processor, which may work in conjunction with processor(s) 210. For instance, MCUs, µCs, DSPs, and the like, may be configured in other system blocks of system 200. Communications block 240 may include a local processor, for instance, to control aspects of communication with host computer 110 (e.g., via Bluetooth, Bluetooth LE, RF, IR, hardwire, ZigBee, Z-Wave, Logitech Unifying, or other communication protocol). Processor(s) 210 may be local to the peripheral device (e.g., contained therein), may be external to the peripheral device (e.g., off-board processing, such as by a corresponding host computing device), or a combination thereof. Processor(s) 210 may perform any of the various functions and methods (e.g., methods 600) described and/or covered by this disclosure in conjunction with any other system blocks in system 200. In some implementations, processor 302 of FIG. 3 may work in conjunction with processor 210 to perform some or all of the various methods described throughout this disclosure. In some embodiments, multiple processors may enable increased performance characteristics in system 200 (e.g., speed and bandwidth), however multiple processors are not required, nor necessarily germane to the novelty of the embodiments described herein. One of ordinary skill in the art would understand the many variations, modifications, and alternative embodiments that are possible.

Memory block ("memory") 220 can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM) and/or applications stored in media storage that can be read into memory for execution by processing devices (e.g., processor(s) 210). Software can be implemented as a single program or a collection of separate programs and can be stored in non-volatile storage and copied in whole or in-part to volatile working memory during program execution. In some embodiments, memory 220 may store data corresponding to inputs on the peripheral device, such as a detected movement of the peripheral device a sensor (e.g., optical sensor, accelerometer, etc.), activation of one or more input elements (e.g., buttons, sliders, touch-sensitive regions, etc.), or the like. Stored data may be aggregated and send via reports to a host computing device.

In certain embodiments, memory 220 can store the various data described throughout this disclosure. For example, memory 220 can store and/or include instructions configured to perform the various hybrid switch controlling schemas presented herein, such as methods 800, 890, 950, and 1050 of FIGS. 8A, 8B, 9D, and 10B, respectively. Memory 220 can be used to store any suitable data to perform any function described herein and as would be appreciated by one of ordinary skill in the art with the benefit of this disclosure. Memory array 220 can be referred to as a storage system or storage subsystem, and can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., software-controlled switches, etc.) as described herein.

Power management system 230 can be configured to manage power distribution, recharging, power efficiency, haptic motor power control, and the like. In some embodiments, power management system 230 can include a battery (not shown), a Universal Serial Bus (USB)-based recharging system for the battery (not shown), and power management devices (e.g., voltage regulators—not shown), and a power grid within system 200 to provide power to each subsystem (e.g., communications block 240, etc.). In certain embodiments, the functions provided by power management system 230 may be incorporated into processor(s) 210. Alternatively, some embodiments may not include a dedicated power management block. For example, functional aspects of power management block 240 may be subsumed by another block (e.g., processor(s) 210) or in combination therewith. The power source can be a replaceable battery, a rechargeable energy storage device (e.g., super capacitor, Lithium Polymer Battery, NIMH NiCd), or a corded power supply. The recharging system can be an additional cable (specific for the recharging purpose) or it can use a USB connection to recharge the battery.

Communication system 240 can be configured to enable wireless communication with a corresponding host computing device (e.g., 110), or other devices and/or peripherals, according to certain embodiments. Communication system 240 can be configured to provide radio-frequency (RF), Bluetooth®, Logitech proprietary communication protocol (e.g., Unifying, Gaming Lightspeed, or others), infra-red (IR), ZigBee®, Z-Wave, or other suitable communication technology to communicate with other computing devices and/or peripheral devices. System 200 may optionally comprise a hardwired connection to the corresponding host computing device. For example, input device 130 can be configured to receive a USB, FireWire®, Thunderbolt®, or other universal-type cable to enable bi-directional electronic communication with the corresponding host computing device or other external devices. Some embodiments may utilize different types of cables or connection protocol standards to establish hardwired communication with other entities. In some aspects, communication ports (e.g., USB), power ports, etc., may be considered as part of other blocks described herein (e.g., input detection module 250, output control module 260, etc.). In some aspects, communication system 240 can send reports generated by the processor(s) 210 (e.g., HID data, streaming or aggregated data, etc.) to a host computing device. In some cases, the reports can be generated by the processor(s) only, in conjunction with the processor(s), or other entity in system 200. Communication system 240 may incorporate one or more antennas, oscillators, etc., and may operate at any suitable frequency band (e.g., 2.4 GHz), etc. One of ordinary skill in the art with the benefit of this disclosure would appreciate the many modifications, variations, and alternative embodiments thereof.

Input detection module 250 can control the detection of a user-interaction with input elements (also referred to as "elements") on an input device. For instance, input detection module 250 can detect user inputs from motion sensors, keys or buttons (e.g., depressible elements), roller wheels, scroll wheels, track balls, touch pads (e.g., one and/or two-dimensional touch sensitive touch pads), click wheels, dials, keypads, microphones, GUIs, touch-sensitive GUIs, proximity sensors (e.g., IR, thermal, Hall effect, inductive sensing, etc.) image sensor based detection such as gesture detection (e.g., via webcam), audio based detection such as voice input (e.g., via microphone), or the like, as would be appreciated by one of ordinary skill in the art with the benefit of this disclosure. Alternatively, the functions of input detection module 250 can be subsumed by processor 210, or in combination therewith.

In some embodiments, input detection module 250 can detect a touch or touch gesture on one or more touch sensitive surfaces on input device 130. Input detection block 250 can include one or more touch sensitive surfaces or touch sensors. Touch sensors generally comprise sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Certain embodiments of computer peripheral device 150 may or may not utilize touch detection or touch sensing capabilities.

Input detection block 250 can include touch and/or proximity sensing capabilities. Some examples of the types of touch/proximity sensors may include, but are not limited to, resistive sensors (e.g., standard air-gap 4-wire based, based on carbon loaded plastics which have different electrical characteristics depending on the pressure (FSR), interpolated FSR, strain etc.), capacitive sensors (e.g., surface capacitance, self-capacitance, mutual capacitance, etc.), optical sensors (e.g., light barrier type (default open or closed), infrared light barriers matrix, laser based diode coupled with photo-detectors that could measure the time of flight of the light path, etc.), acoustic sensors (e.g., piezo-buzzer coupled with microphones to detect the modification of a wave propagation pattern related to touch points, etc.), inductive sensors, magnetic sensors (e.g., Hall Effect, etc.), or the like.

Input detection module 250 may include a movement tracking sub-block that can be configured to detect a relative displacement (movement tracking) of the computer peripheral device 150. For example, input detection module 250 optical sensor(s) such as IR LEDs and an imaging array of photodiodes to detect a movement of computer peripheral device 150 relative to an underlying surface. Computer peripheral device 150 may optionally include movement tracking hardware that utilizes coherent (laser) light. Moving tracking can provide positional data (e.g., delta X and delta Y data from last sampling) or lift detection data. For example, an optical sensor can detect when a user lifts computer peripheral device 130 off of an underlying surface (also referred to as a "work surface") and can send that data to processor 210 for further processing. In some embodiments, processor 210, the movement tracking block (which may include an additional dedicated processor), or a combination thereof, as would be appreciated by one of ordinary skill in the art with the benefit of this disclosure.

In certain embodiments, accelerometers can be used for movement detection. Accelerometers can be electromechanical devices (e.g., micro-electromechanical systems (MEMS) devices) configured to measure acceleration forces (e.g., static and dynamic forces). One or more accelerometers can be used to detect three dimensional (3D) positioning. For example, 3D tracking can utilize a three-axis accelerometer or two two-axis accelerometers (e.g., in a "3D air mouse," HMD, or other device). Accelerometers can further determine if the input device 150 has been lifted off of an underlying surface and can provide movement data that may include the velocity, physical orientation, and acceleration of computer peripheral device 150. In some embodiments, gyroscope(s) can be used in lieu of or in conjunction with accelerometer(s) to determine movement or input device orientation.

In some embodiments, output control module 260 can control various outputs for a corresponding computer peripheral device. For instance, output control module 260 may control a number of visual output elements (e.g., LEDs, LCD screens), displays, audio outputs (e.g., speakers), haptic output systems, or the like. One of ordinary skill in the art with the benefit of this disclosure would appreciate the many modifications, variations, and alternative embodiments thereof.

Although certain systems may not be expressly discussed, they should be considered as part of system 200, as would be understood by one of ordinary skill in the art. For example, system 200 may include a bus system to transfer power and/or data to and from the different systems therein. It should be appreciated that system 200 is illustrative and that variations and modifications are possible. System 200 can have other capabilities not specifically described herein. Further, while system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Embodiments of the present invention can be realized in a variety of apparatuses including electronic devices (e.g., computer peripheral devices) implemented using any combination of circuitry and software. Furthermore, aspects and/or portions of system 200 may be combined with or operated by other sub-systems as required by design. For example, input detection module 250 and/or memory 220 may operate within processor(s) 210 instead of functioning as a separate entity. In addition, the inventive concepts described herein can also be applied to any electronic device. Further, system 200 can be applied to any of the computer peripheral devices described in the embodiments herein, whether explicitly, referentially, or tacitly described (e.g., would have been known to be applicable to a particular computer peripheral device by one of ordinary skill in the art). The foregoing embodiments are not intended to be limiting and those of ordinary skill in the art with the benefit of this disclosure would appreciate the myriad applications and possibilities.

System for Operating a Host Computing Device

Figure 3:
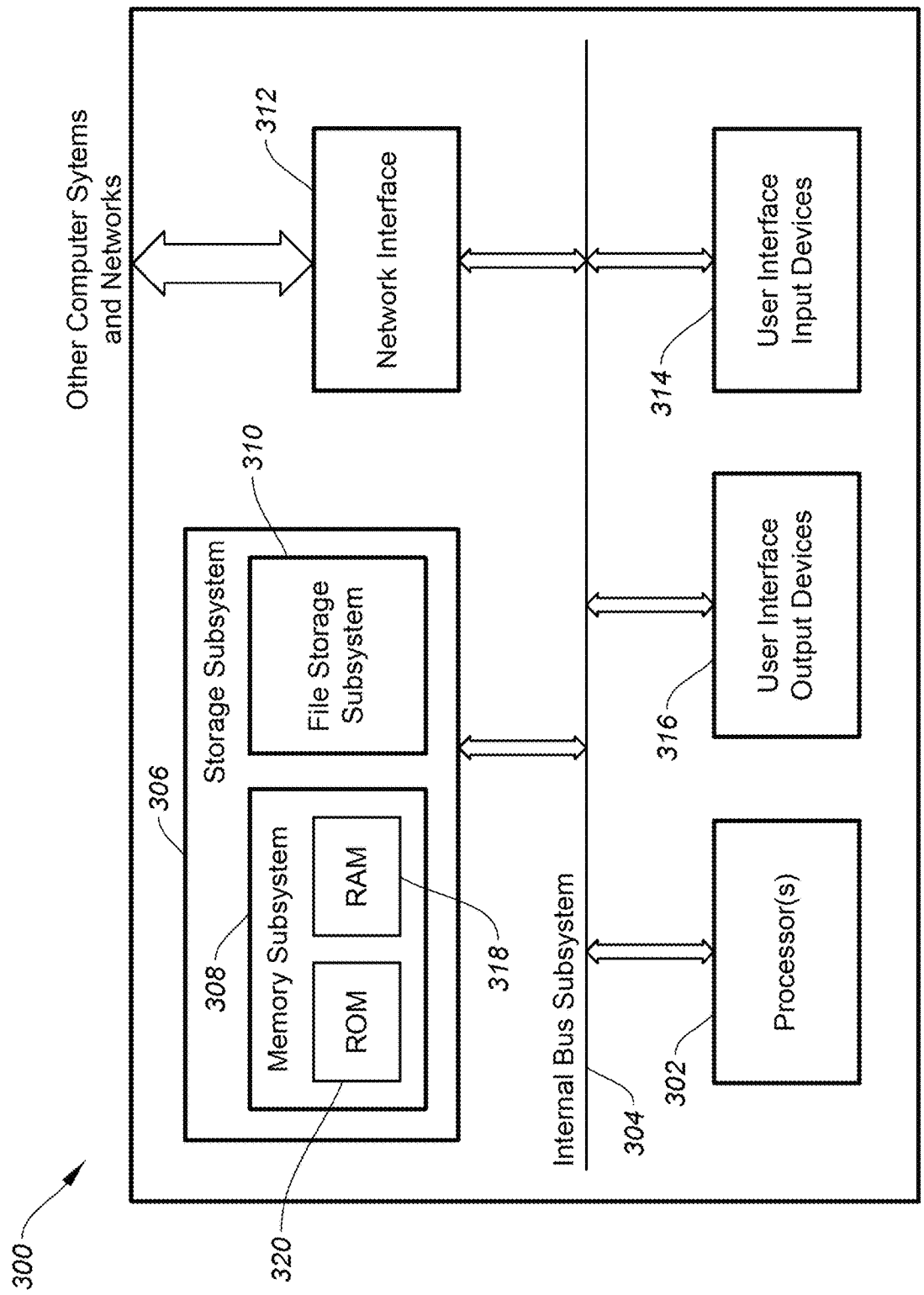
FIG. 3 shows a simplified block diagram of a system for operating a host computing device, according to certain embodiments.

FIG. 3 is a simplified block diagram of a host computing device 300, according to certain embodiments. Host computing device 300 can implement some or all functions, behaviors, and/or capabilities described above that would use electronic storage or processing, as well as other functions, behaviors, or capabilities not expressly described. Host computing device 300 can include a processing subsystem (processor(s)) 302, a storage subsystem 306, user interfaces 314, 316, and a communication interface 312. Computing device 300 can also include other components (not explicitly shown) such as a battery, power controllers, and other components operable to provide various enhanced capabilities. In various embodiments, host computing device 300 can be implemented in any suitable computing device, such as a desktop or laptop computer (e.g., desktop 110), mobile device (e.g., tablet computer, smart phone, mobile phone), wearable device, media device, or the like, or in peripheral devices (e.g., keyboards, etc.) in certain implementations.

Processor(s) 302 can include MCU(s), micro-processors, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of methods, functions, etc., described throughout this disclosure.

Storage subsystem 306 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include a memory subsystem 308 including random access memory (RAM) 318 such as dynamic RAM (DRAM), static RAM (SRAM), synchronous dynamic RAM (e.g., DDR), or battery backed up RAM or read-only memory (ROM) 320, or a file storage subsystem 310 that may include one or more code modules. In some embodiments, storage subsystem 306 can store one or more applications and/or operating system programs to be executed by processing subsystem 302, including programs to implement some or all operations described above that would be performed using a computer. For example, storage subsystem 306 can store one or more code modules for implementing one or more method steps described herein.

A firmware and/or software implementation may be implemented with modules (e.g., procedures, functions, and so on). A machine-readable medium tangibly embodying instructions may be used in implementing methodologies described herein. Code modules (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc. These descriptions of software, firmware, storage mediums, etc., apply to systems 200 and 300, as well as any other implementations within the wide purview of the present disclosure. In some embodiments, aspects of the invention (e.g., surface classification) may be performed by software stored in storage subsystem 306, stored in memory 220 of a computer peripheral device, or both. One of ordinary skill in the art with the benefit of this disclosure would appreciate the many modifications, variations, and alternative embodiments thereof.

Implementation of the techniques, blocks, steps and means described throughout the present disclosure may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module may comprise sets of instructions (codes) embodied on a computer-readable medium that directs a processor of a host computing device 110 to perform corresponding actions. The instructions may be configured to run in sequential order, in parallel (such as under different processing threads), or in a combination thereof. After loading a code module on a general purpose computer system, the general purpose computer is transformed into a special purpose computer system.

Computer programs incorporating various features described herein (e.g., in one or more code modules) may be encoded and stored on various computer readable storage media. Computer readable media encoded with the program code may be packaged with a compatible electronic device, or the program code may be provided separately from electronic devices (e.g., via Internet download or as a separately packaged computer readable storage medium). Storage subsystem 306 can also store information useful for establishing network connections using the communication interface 312.

Computer system 300 may include user interface input devices 314 elements (e.g., touch pad, touch screen, scroll wheel, click wheel, dial, button, switch, keypad, microphone, etc.), as well as user interface output devices 316 (e.g., video screen, indicator lights, speakers, headphone jacks, virtual- or augmented-reality display, etc.), together with supporting electronics (e.g., digital to analog or analog to digital converters, signal processors, etc.). A user can operate input devices of user interface 314 to invoke the functionality of computing device 300 and can view and/or hear output from computing device 300 via output devices of user interface 316.

Processing subsystem 302 can be implemented as one or more processors (e.g., integrated circuits, one or more single core or multi core microprocessors, microcontrollers, central processing unit, graphics processing unit, etc.). In operation, processing subsystem 302 can control the operation of computing device 300. In some embodiments, processing subsystem 302 can execute a variety of programs in response to program code and can maintain multiple concurrently executing programs or processes. At a given time, some or all of a program code to be executed can reside in processing subsystem 302 and/or in storage media, such as storage subsystem 304. Through programming, processing subsystem 302 can provide various functionality for computing device 300. Processing subsystem 302 can also execute other programs to control other functions of computing device 300, including programs that may be stored in storage subsystem 304.

Communication interface (also referred to as network interface) 312 can provide voice and/or data communication capability for computing device 300. In some embodiments, communication interface 312 can include radio frequency (RF) transceiver components for accessing wireless data networks (e.g., Wi-Fi network; 3G, 4G/LTE; etc.), mobile communication technologies, components for short range wireless communication (e.g., using Bluetooth communication standards, NFC, etc.), other components, or combinations of technologies. In some embodiments, communication interface 312 can provide wired connectivity (e.g., universal serial bus (USB), Ethernet, universal asynchronous receiver/transmitter, etc.) in addition to, or in lieu of, a wireless interface. Communication interface 312 can be implemented using a combination of hardware (e.g., driver circuits, antennas, modulators/demodulators, encoders/decoders, and other analog and/or digital signal processing circuits) and software components. In some embodiments, communication interface 312 can support multiple communication channels concurrently.

User interface input devices 314 may include any suitable computer peripheral device (e.g., computer mouse, keyboard, gaming controller, remote control, stylus device, etc.), as would be appreciated by one of ordinary skill in the art with the benefit of this disclosure. User interface output devices 316 can include display devices (e.g., a monitor, television, projection device, etc.), audio devices (e.g., speakers, microphones), haptic devices, etc. Note that user interface input and output devices are shown to be a part of system 300 as an integrated system. In some cases, such as in laptop computers, this may be the case as keyboards and input elements as well as a display and output elements are integrated on the same host computing device. In some cases, the input and output devices may be separate from system 300, as shown in FIG. 1. One of ordinary skill in the art with the benefit of this disclosure would appreciate the many modifications, variations, and alternative embodiments thereof.

It will be appreciated that computing device 300 is illustrative and that variations and modifications are possible. A host computing device can have various functionality not specifically described (e.g., voice communication via cellular telephone networks) and can include components appropriate to such functionality. While the computing device 300 is described with reference to particular blocks, it is to be understood that these blocks are defined for convenience of description and are not intended to imply a particular physical arrangement of component parts. For example, processing subsystem 302, storage subsystem 306, user interfaces 314, 316, and communications interface 312 can be in one device or distributed among multiple devices. Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Host computing devices or even peripheral devices described herein can be implemented using system 300.

Contact-Based Switches

In the present computer peripheral market (e.g., computer mouse and keyboard devices), click detection (e.g., detecting when a depressible element such as a left/right button or key is depressed) is primarily based on contact-based switches (e.g., galvanic/electric), where a physical contact between two elements causes the input device to generate a control signal. Contact-based switches typically utilize galvanic isolation, which involves isolating functional sections of electrical systems to prevent current flow such that no direct conduction path is possible. In other words, when the physical switch is closed, electric current flows and a signal is typically generated such as a button press signal or other suitable human interface device (HID) signal, as would be appreciated by one of ordinary skill in the art with the benefit of this disclosure. When the switch is open, no electric current flows and typically no HID signal is generated. Contact-based switches have been in use for many decades and have been steadily improved for better longevity, reliability, and price over the years. Contact-based switches also have excellent power efficiency. While the switch is open (e.g., while the button is at rest and is not being depressed or activated), there is effectively no current flow and practically zero power dissipation (e.g., ignoring negligible micro-amp range leakage currents, etc.). While the switch is closed, which is typically at millisecond range durations, the operating current and corresponding power dissipation is still relatively very low (e.g., 100-400 µA or the like). Despite the excellent power dissipation characteristics, contact-based switches, like any type of switch, are subject to repeated mechanical impact and after some time the contacts mechanically or chemically wear out resulting in noisy data that may be unreliable or unusable, which can render the corresponding input device at least partially inoperable and unfit for its intended use. According to certain embodiments, a hybrid switch approach (see, e.g., FIG. 6) can present a superior depressible element structure that incorporates aspects of a contact-based switch with a second switch (e.g., a contactless switch) that takes advantage of the excellent power dissipation characteristics of the contact-based switch, while mitigating its weakness in longevity, as further described below with respect to FIG. 6.

Figure 4A:
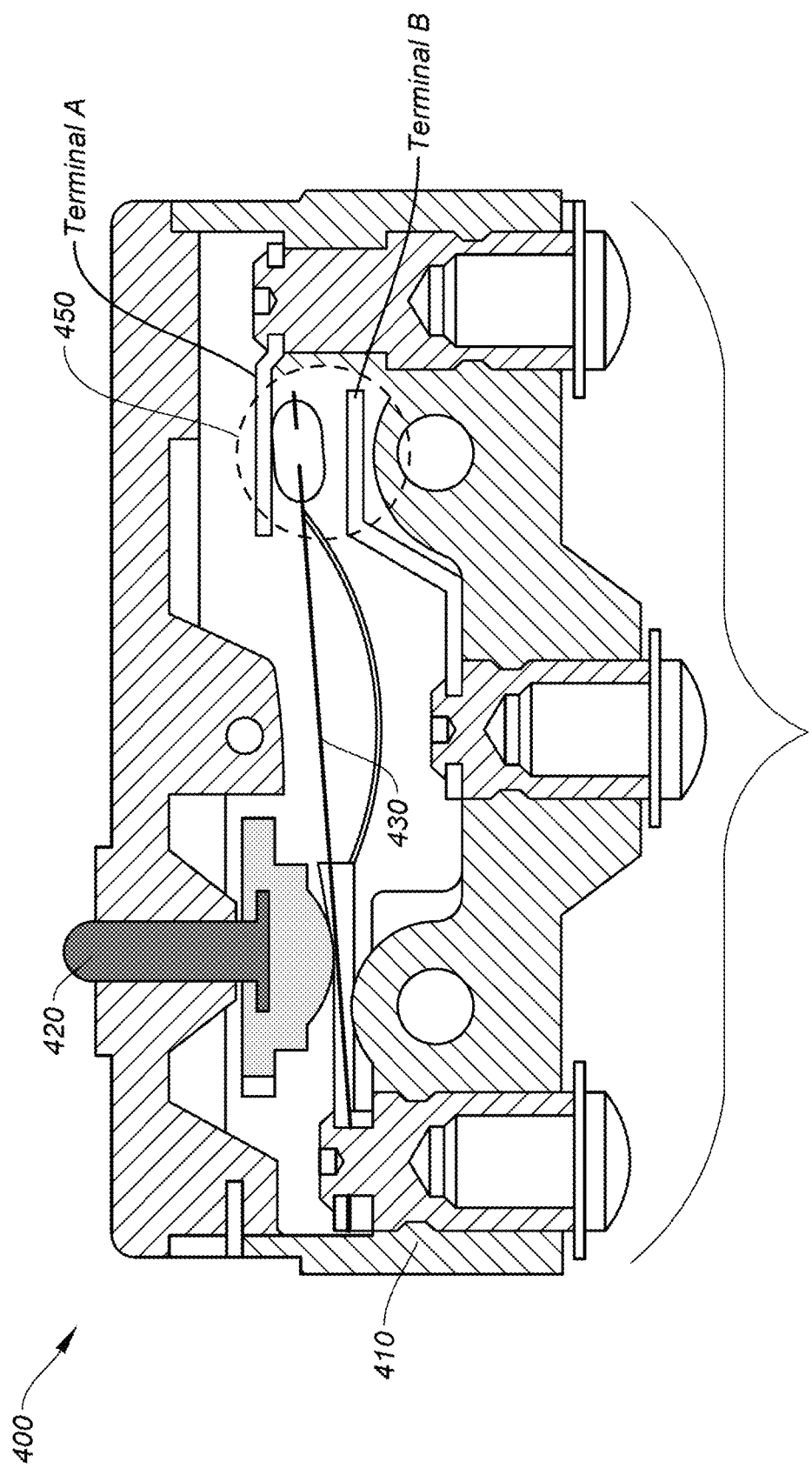
FIG. 4A shows a cross-section of an example of a contact-based switch for an input device.

FIG. 4A shows a cross-section of a simplified example of a contact-based switch 400 for an input device. Contact-based switch 400 can include a housing 410, actuator 420, biasing mechanism 430, terminal section 440, and contact 450. Housing 410 is configured to contain and protect the internal mechanisms of switch 400 providing electrical insulation and mechanical integrity. Housing 410 may be a self-contained subassembly of an input device (e.g., computer mouse, keyboard, etc.), although some embodiments may employ multiple switches in a shared housing, such as the type used in hybrid switch 600, as further described below with respect to FIG. 6.

Actuator 420 can be configured to transfer a movement and external imparted force to the internal mechanism of switch 400. For example, a user may press actuator 420 directly or indirectly (e.g., via a button, key cap, etc., coupled to actuator 420) to cause actuator 420 to move according to a linear translational path and impart a force onto biasing mechanism 430. In some aspects, the depressible element can be the key or button in combination with actuator 420, as would be appreciated by one of ordinary skill in the art with the benefit of this disclosure. Actuator 420 may be comprised of multiple elements, including user interface elements (e.g., mouse button, key cap, etc.) and internal elements to better transfer force to internal components. Referring to FIG. 4A, the bottom portion of actuator 420 is dome-shaped where it contacts biasing mechanism 430. Any suitable shape or number of elements can be used as would be appreciated by one of ordinary skill in the art with the benefit of this disclosure.

Figure 4B:
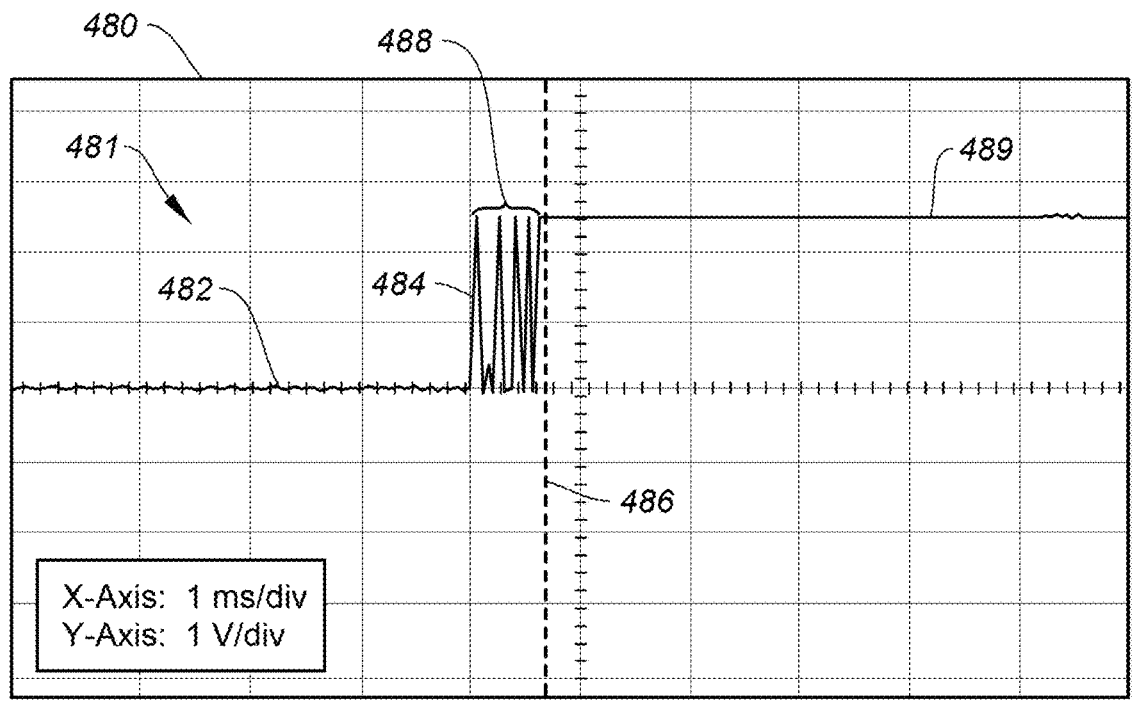
FIG. 4B is a signal diagram showing an example of a typical signal corresponding to a click event by a properly functioning contact-based switch.
Figure 4C:
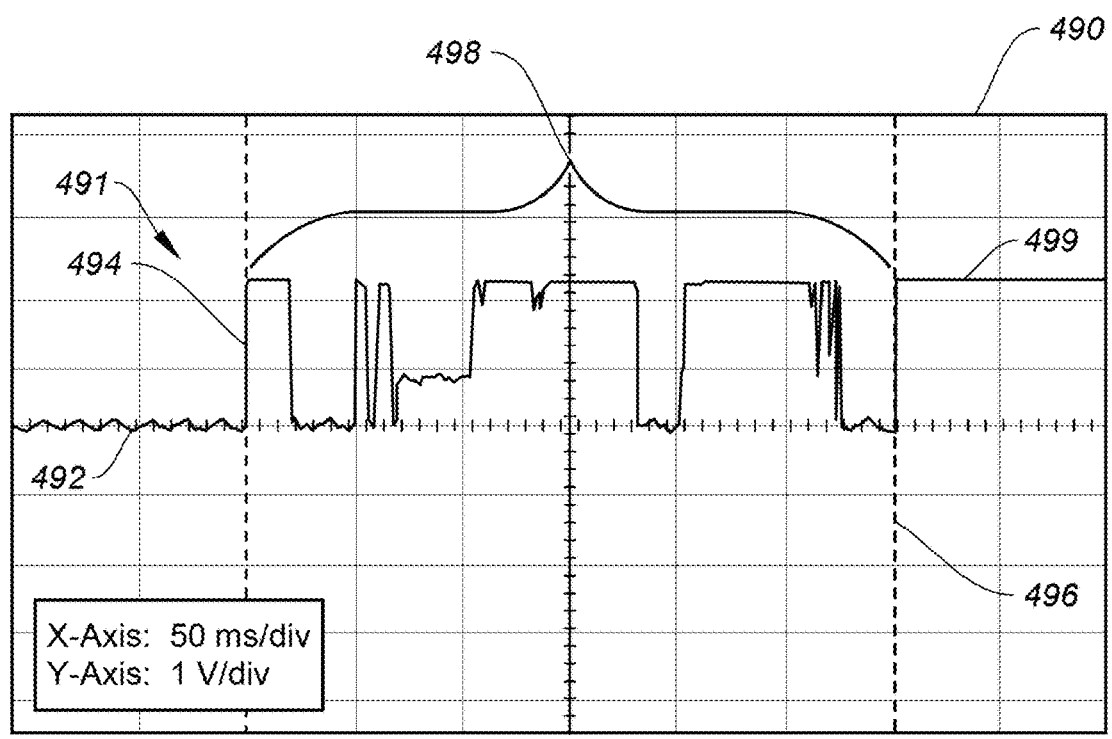
FIG. 4C is a signal diagram showing an example of a possible signal corresponding to a click event by an improperly functioning contact-based switch.

Biasing mechanism 430 can be a conductive spring configured to perform a snap action when the actuator is depressed. Biasing mechanism is typically comprised of or includes a conductive material (e.g., copper, gold, aluminum, silver, iron, zinc, or alloy thereof, etc.) to conduct electricity. Actuator 420 typically imparts a user-induced force (e.g., from a button or key press) onto the biasing mechanism on a first end, which may cause biasing mechanism 430 to move a contact 450 on a second end of biasing mechanism 430 to move from a first position—an open circuit condition with contact 450 contacting terminal A as shown in FIG. 4A, to a second position—a closed circuit condition with contact 450 contacting terminal B. In some cases, the first position may correspond to the depressible element (e.g., actuator 420 and corresponding elements) being non-pressed to a particular position or within a range of positions such that contact 450 does not come into electrical contact with terminal B, and the second position may correspond to the depressible element being depressed enough to cause contact 450 to make electrical contact with terminal B. Biasing mechanism 430 may further provide a restoring force to actuator 420 causing it to return from the second position back to the first position. Terminal section 440 can connect switch 400 to external circuitry. For instance, when contact 450 is contacting terminal A, a corresponding terminal (e.g., the right-side terminal of FIG. 4A) may couple terminal A to an external circuit, bus, or the like (e.g., signal ground), and when contact 450 is contacting terminal B, a corresponding terminal (e.g., the middle terminal of FIG. 4A) may couple terminal B to another external circuit, bus, or the like (e.g., signal output). When applied to a hybrid switch circuit, as further described below, moving actuator 420 to cause contact 450 to come into electrical contact with terminal B may cause switch 400 to generate a signal, as shown in FIG. 4B or FIG. 4C (e.g., when contact 450 and terminals A and B are worn out and do not make a good electrical coupling). FIG. 4A provides one simplified embodiments of a contact-based switch and one of ordinary skill in the art with the benefit of this disclosure would appreciate the many modifications, variations, and alternative embodiments thereof.

FIG. 4B is a signal diagram 480 showing an example of a typical signal 481 corresponding to a click event by a properly functioning contact-based switch. Signal 481 switches from low voltage (e.g., electrical ground) 482 to a higher voltage (e.g., rail voltage) 489 when contact 450 makes electrical contact with terminal B. A typical contact-based switch in good condition (e.g., no considerable wear-and-tear) literally bounces briefly when contact is made, which typically last about 2-5 µs micro/milliseconds, and manifests in the signal as a signal ripple 488. This occurs during normal operation and typically does not affect the ability to decipher single click, double click, click-and-hold, or other common types of button inputs, however debouncing algorithms to interpret and account of bouncing may add some latency to detection (e.g., 1 ms or more). A clean, fully transitioned signal 489 occurs after the bouncing decays at threshold 486 (e.g., typically 2 V, 3.3 V, or the like). With a "good" contact, the bouncing may last approximately 0.7 ms and typically less than 1-2 ms. A typical click from a user may be as short as 30 ms, thus 1 ms bouncing is often inconsequential when trying to ascertain the intended input (e.g., single click, double click, etc.).

FIG. 4C shows an example of a possible signal corresponding to a click event by an improperly functioning contact-based switch. As can be seen in FIG. 4C, signal 491 is noisy and does not show a clean transition between a low and high voltage in response to the depressible element being pressed and causing contact 450 to make contact with terminal B. Signal 491 transition from a low voltage 492 to a relatively long period of signal noise 498 until a solid high voltage signal 499 is recognized at threshold 496. It is unclear whether the noise includes ripple, if a double click occurred, etc., and an unreliable output may result. The deleterious noise occurs for approximately 300 ms. Since a typical user click may take approximately 30 ms, it can be plainly seen how interpreting a user input (e.g., click, double click, click-and-hold, etc.) can be misinterpreted, and in some cases the noise may not actually be related to a user input at all. FIG. 4C is indicative of some contact-based switches with substantial wear-and-tear on the contact and/ or the corresponding terminals, which can limit the operational life of the input device, as noted above.

Contactless Switches

In light of the longevity and reliability problems typically associated with contact-based switches, some contemporary manufacturers have changed to contactless switches. Contactless switch typically does not have mechanically interfacing elements (no contacts) during operation and can have a substantially longer operational life since there are no critical components subject to wear-and-tear. Thus, contactless switches can provide very clean signals to allow the input device to have a longer operational life. Some non-limiting examples of contactless switches include optical switches (described in embodiments herein), magnetic switches, inductive switches, capacitive switches, piezo switches, and the like. In addition, because contactless switches do not involve a physical contact between elements, no additional latency is needed to apply debouncing algorithms, and the like. Despite these advantages, contactless switches (e.g., optical switches) can consume significantly more current than a contact-based switch as they have to be actively "checked" periodically to confirm whether the switch is open or closed.

FIG. 5A shows an example of an operation of an optical switch sensor 500 with a default-open configuration, according to certain embodiments. Optical switch sensor ("optical switch") 500 can include an emitter 520, a receiver 530, and a barrier 510 that is typically directly or indirectly coupled to an actuator (e.g., similar to actuator 420) to move up and down in correspondence with the movements of the depressible element. Barrier 510 can also be referred to as a "shutter." Typically, barrier 510 can move from a first position that does not obstruct a line-of-sight between emitter 520 and receiver 530 and a second position that obstructs the line-of-sight. Barrier 510 may provide an analog-like operation by allowing a user to adjust a position of barrier 510 by modulating an amount of obstruction that can range from complete obstruction, to some obstruction, to no obstruction. In operation, emitter 520 typically includes a light emitting diode (LED) that is pulsed (e.g., 20-50 μs) at an LED current (e.g., 5-6 mA) and a fixed frequency (e.g., 1 ms), which is typical in contemporary high-end gaming peripherals (e.g., computer mice and keyboards). The light 525 is projected from emitter 520 towards receiver 530, which can be a phototransistor or other light-sensing element. The amount of current generated by receiver 530 can correspond to an amount of light 525 received from emitter 520. Unlike contact-based switches, which typically have a binary output including an "on" (closed circuit) or "off" (open circuit) operation, contactless switches may allow no light, some light, or all light emitted from emitter 520 to reach receiver 530, thus allowing any number of intermediary settings and can allow a user to set an "on" condition to any suitable actuation threshold (e.g., corresponding output from receiver 530), which can correspond to how far a button or key needs to be pressed to instantiate a click, as further discussed below with respect to FIGS. 10A-10B. Referring back to FIG. 5A, optical switch 500 is in a normally open configuration where the switch allows light 525 emitted from emitter 520 to reach receiver 530 unobstructed when the actuator that controls barrier 510 is not pressed, and blocks the light 525 from emitter 520 when the actuator is depressed.

FIG. 5B shows a switch 550 with a normally-closed configuration where the switch blocks light 575 emitted from emitter 570 to reach receiver 580 when the actuator that controls barrier 560 is not pressed, and allows the light 575 from emitter 570 to reach receiver 580 when the actuator is depressed. In either configuration, despite the advantages of having a clean signal (e.g., no bouncing or corresponding latency to debounce), an ability to set an actuation threshold, and substantially improved longevity over contact-based switches, contactless switches utilize power at all times, even when the depressible element is not pressed in order to detect the state of the button in an acceptably fast time (e.g., within 1 ms), and thus utilizes substantially more power than contact-based switches.

Hybrid Switches

Aspects of the invention use a hybrid switch design (e.g., hybrid switch 600) that utilizes both a contact-based switch and a contactless switch to create an improved switch design that gains the benefits of both types of switches and mitigates their drawbacks. In some embodiments, the contact-based switch may be used when the input device is in a low power mode to take advantage of its low power consumption characteristics, as described above. The contact-based switch can then wake the mouse (in response to a click) very low power consumption. In some aspects, a leading edge 484 of a signal 481 (or another portion thereof) can be used to trigger the wake function and cause the input device to switch from a low power mode of operation to an active, higher power mode of operation. Even when the contact-based switch begins to fail and produces noisy and potentially undecipherable signals as a user input (e.g., click, double click, click-and-hold, etc.), as shown in signal 491, the rising edge 494 may be used simply as a binary trigger to cause the input device to switch from the low power (sleep) mode to the active (wake) mode. Thus, any amount of noise can be present on the signal as a result of a button press event and a faulty contact-based switch can still be reliably used to trigger a state change because a simple rising edge, though poorly rendered, can still be reliably generated.

The contactless switch may also be used in the same hybrid switch architecture and may be configured to be activated while in the high power mode, which can take advantage of its excellent reactivity and reliability characteristics and avoid much of its higher power consumption drawbacks by keeping the contactless switch off during low power sleep modes and on only during active modes. Thus, the hybrid switch uses the contact-based switch during sleep mode, which has very low power requirements, and utilizes its contact signal (e.g., a leading rising edge) to activate the contactless switch and cause the input device to enter an active mode. In some embodiments, the signal from the contact-based switch is not used to interpret user inputs (e.g., clicks, double clicks, etc.), and is only used to change the operational state (e.g., sleep mode, active mode) of the input device. In some embodiments, the contact-based switch can be used to interpret user inputs and the contactless switch can be used to confirm them (e.g., the contactless switch may confirm that what appears to be a click from the contact-based switch data also appears to be a click based on the contactless switch data. This "interrupt" approach may provide further improved power consumption as the optical switch is only used when a click is detected on the contact-based switch, rather than the former method where the optical switch stays on after detecting a signal from the contact-based switch (and subsequently goes inactive after a period of inactivity). In addition to the clear power advantages and reliability of hybrid switch implementations, other functional modes of operation are possible that would otherwise be impractical with a single switch implementation. For instance, some embodiments can improve latencies inherent in typical device report protocols and allow for preemptive clicking and faster performance, as further described below at least with respect to FIGS. 9A-10. Although the many embodiments described and depicted in the present application typically combine a contact-based switch and a contactless switch in a hybrid-switch application, it should be understood that any types of switches can be used including two contact-based switches, two contactless-type switches, more than two switches of any combination, or the like. Furthermore, some of the embodiments described herein describe a hybrid switch with two switches in the same package (e.g., see FIG. 6). It should be understood that some embodiments may employ switches in separate packages. One of ordinary skill in the art with the benefit of this disclosure would appreciate the many modifications, variations, and alternative embodiments thereof.

Figure 6:
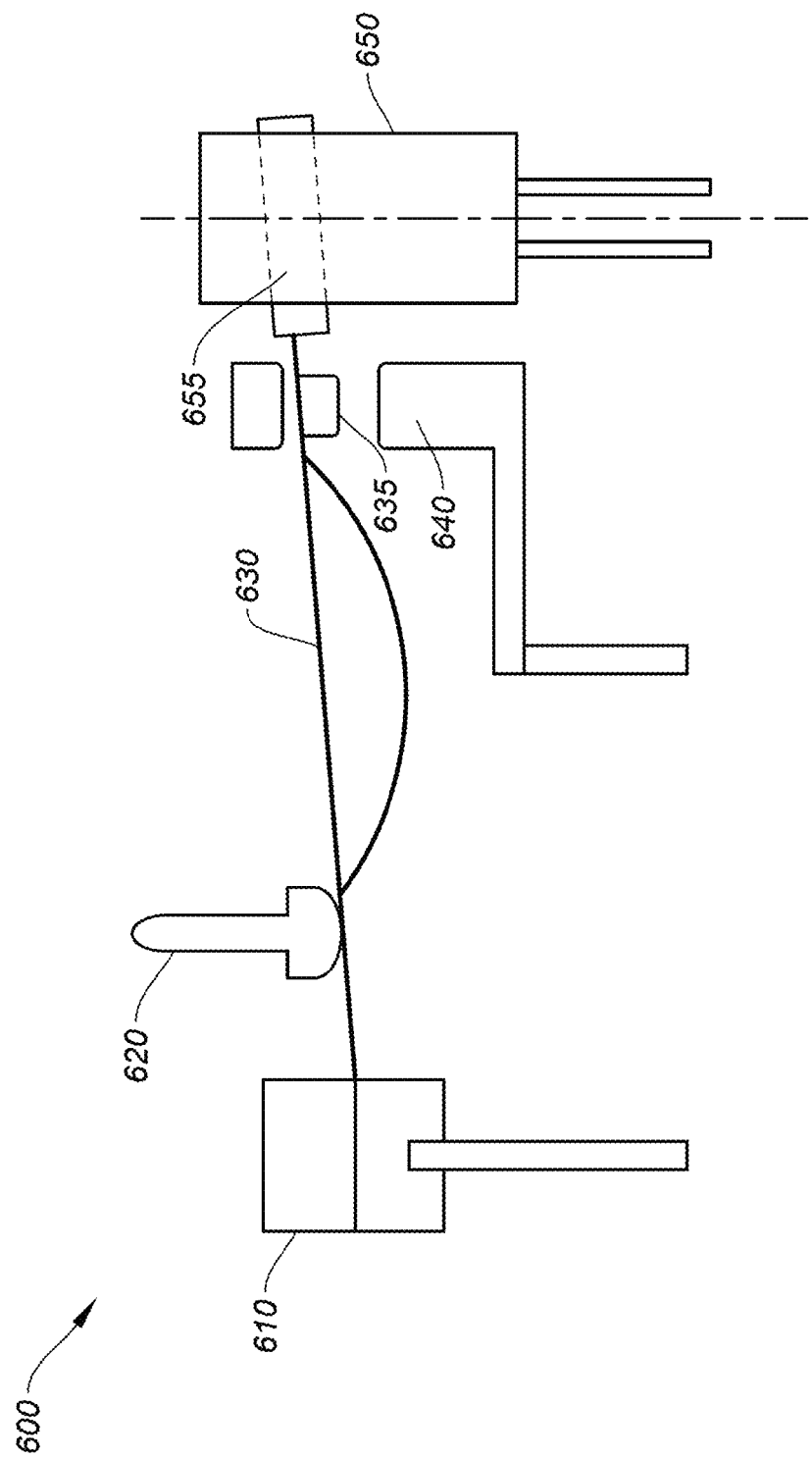
FIG. 6 is an example of a hybrid switch for an input device, according to certain embodiments.

FIG. 6 is an example of a hybrid switch 600 for an input device, according to certain embodiments. Hybrid switch 600 can include front hold and front electronic contact 610, an actuator 620, a biasing mechanism 630 with a mechanical contact 635, and a rear electrical contact 640, thus forming a contact-based switch, which can operate similar to contact-based switch 400. Hybrid switch 600 can further include an optical sensor 650 including a photodiode and photo-transistor, which can operate similar to the contactless switch of FIG. 5B. In operation, as actuator 620 (coupled to a depressible element) is depressed by a user, biasing mechanism 630 is moved down to simultaneously cause contact 635 to be in electrical contact with rear electrical contact 640 and cause barrier 655 to block light from the photodiode and prevent it from reaching the photo-transistor. Thus, both the contact-based switch and the contactless switch can generate a signal indicating that the depressible element is depressed by a threshold distance to generate a "click," or more generally "event data," which can include any suitable output data (e.g., click, double click, etc.). More specifically, in the contact-based switch, when contact 635 electrically couples to rear electrical contact 640, an electrical circuit is closed allowing current from the front electrical contact 610 to flow through biasing mechanism 630, contact 635, to rear electrical contact 640, and out through the terminals (not shown). Hybrid switch 600 can be similar to the topology of contact-based switch 400 but with the additional rear electrical contact and optical sensor 650.

In some embodiments, the contact-based and contactless switches may both generate a signal (e.g., a click or key press) when the depressible element and corresponding actuator 620 is depressed by a threshold distance. In some aspects, the contact-based signal only operates as a trigger to wake the contactless switch and is not used to register an event (e.g., click). In some aspects, the contactless switch can be used to validate a contact-based signal triggered while in a sleep or wake (active) state. In some embodiments, although the biasing mechanism may be used to configure activation of the contact-based switch and contactless switch, in some cases the contactless-based switch can be configured for preemptive activation, as further described below with respect to FIGS. 10A-10B.

By way of example, some embodiments of an input device (e.g., computer mouse 130, keyboard 140) may include one or more processors 210 and a depressible element (a button or key coupled to actuator 620) including two switches including a first switch (e.g., electric or galvanic contact-based switch) configured to generate a first signal when the depressible element is depressed by a threshold distance and a second switch (e.g., contactless switch, such as an optical, capacitive, inductive, magnetic, or piezo type) configured to generate a second signal indicating when the depressible element is depressed by the threshold distance and the second switch is in an active state. The one or more processors can be communicatively coupled to the first switch and the second switch and may be configured to receive the first signal from the first switch, configure the second switch to change from an inactive state to an active state in response to receiving the first signal (e.g., a rising edge), receive the second signal from the second switch in the active state, determine whether the second signal indicates that the depressible element is depressed by the threshold distance, and generate event data (e.g., click, double click, etc.) confirming that the depressible element is depressed by the threshold distance in response to receiving the second signal indicating that the depressible element is depressed by the threshold distance. In certain embodiments, when the second switch is in the active state, the second switch operates in a first power mode (e.g., active mode) and the second switch is configured to continuously or intermittently detect whether the depressible element is depressed by the threshold distance. In some aspects, when the second switch is in the inactive state, the second switch operates in a second power mode (e.g., sleep state) and the second switch does not detect whether the depressible element is depressed by the threshold distance. In such cases, the second switch may consume at least 50% more power when in the first power mode than when in the second power mode. When in the active state, the second switch can detects whether the depressible element is depressed by the threshold distance at a frequency of at least 1 kHz. The second switch can be in an inactive state by default until switched to the active state in response to the one or more processors receiving the first signal. The one or more processors may cause the second switch to switch from the active state to the inactive state after a threshold time of inactivity where the depressible element is not depressed. In some embodiments, differences between the two sensing types can be used to glean more information on the click characteristic from the user. For example, the timing difference between the optical and galvanic switches can provide information about the speed of the click, which can provide information about click velocity (e.g., how fast a user pushes the key down), which can be used to instantiate different effects (e.g., control a magnitude of a click-controlled parameter based on the detected speed of the click).

Figure 7:
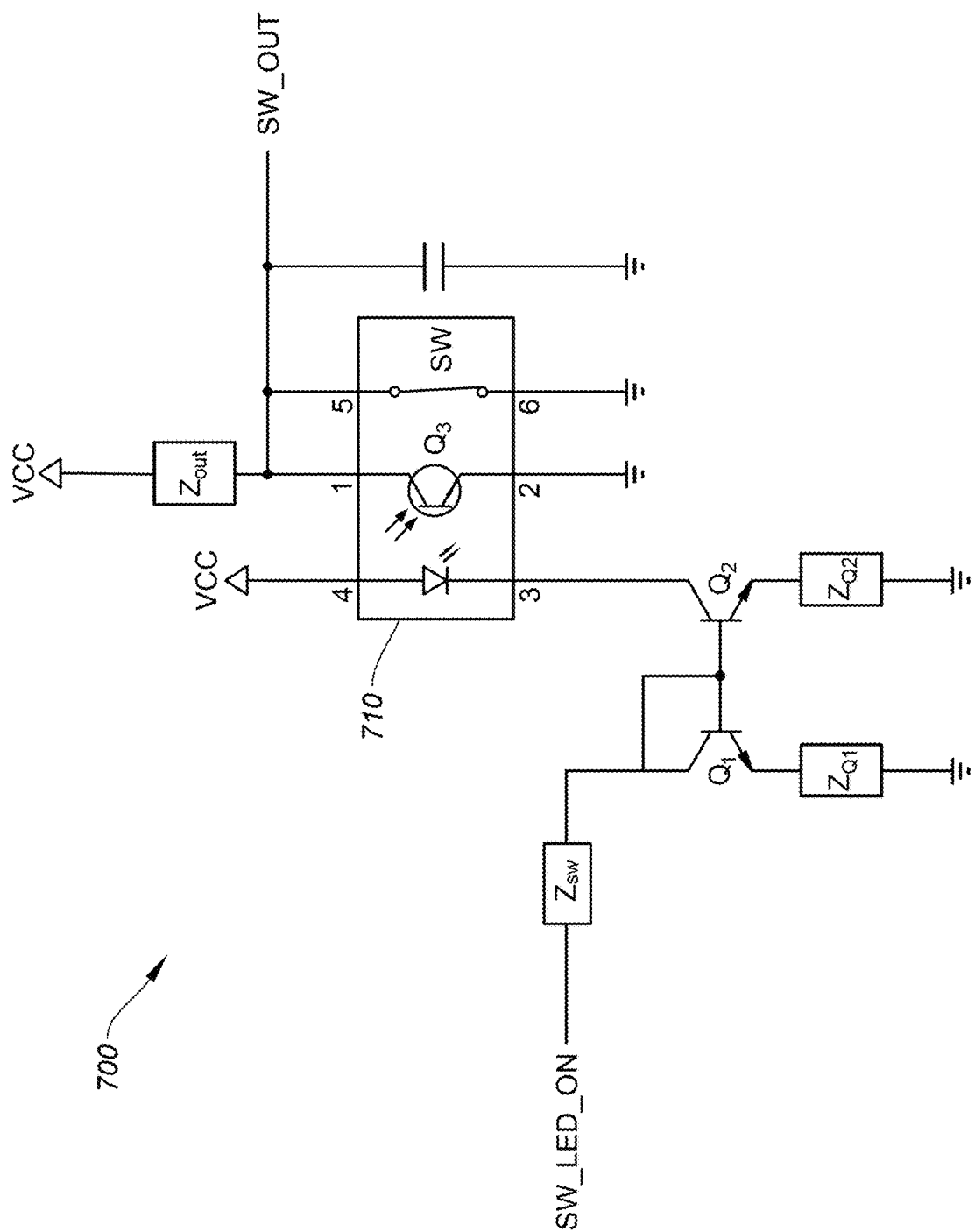
FIG. 7 is an example of an electrical circuit diagram to implement aspects of a hybrid switch, according to certain embodiments.

FIG. 7 is an example of a simplified electrical circuit diagram 700 to implement aspects of a hybrid switch 710, according to certain embodiments. There are a number of ways of controlling a hybrid switch 710 in the manner described above, including a mostly electronic design and through embedded software. In certain implementations of electronic designs, both the contact and contactless switch can be connected in parallel, such that either switch when triggered pulls the line down and causes the "click" event. The hybrid switch 710 may include a contact based switch SW (e.g., electrically accessible via pins 5 and 6) and a contactless switch (e.g., including an LED with electrically accessible points 3 and 4 at the cathode and anode, respectively; and a phototransistor $Q_3$ (e.g., bipolar junction transistor (BJT), field-effect transistor (FET), etc.) with electrically accessible points at pins 2 and 1 at the emitter and collector, respectively) in the same package. In an embedded software approach, both electrical (pin 5) and phototransistor output (pin 1) can be connected to the MCU (processor(s) 210), which can manage the status of each switch independently.

Referring to circuit diagram 700, a current mirror comprising transistors $Q_1$ and $Q_2$ (e.g., BJTs, FETs, etc.) is configured for precision control over a current driving the LED of an optical switch of hybrid switch 710, which drives the base of $Q_3$. When $Q_3$ is sufficiently biased it may pull SW_OUT low. Similarly, when SW is closed, SW_OUT is pulled low (e.g., at or near electrical ground). An SW_OUT low condition may trigger a "click" event. Although an optical switch and a mechanical switch are shown in the same package of a hybrid switch, it should be understood that any suitable combination of a contactless switch and contact-based switch can be implemented in the same package to form a hybrid switch, as described herein. In some embodiments, two contact-based switches or two contactless switches can be used instead, preferably with operational characteristics that take advantage of the power savings, accuracy, longevity, and other advantages described in the various embodiments throughout the present disclosure. One of ordinary skill in the art with the benefit of this disclosure would appreciate the many modifications, variations, and alternative embodiments thereof.

Figure 8A:
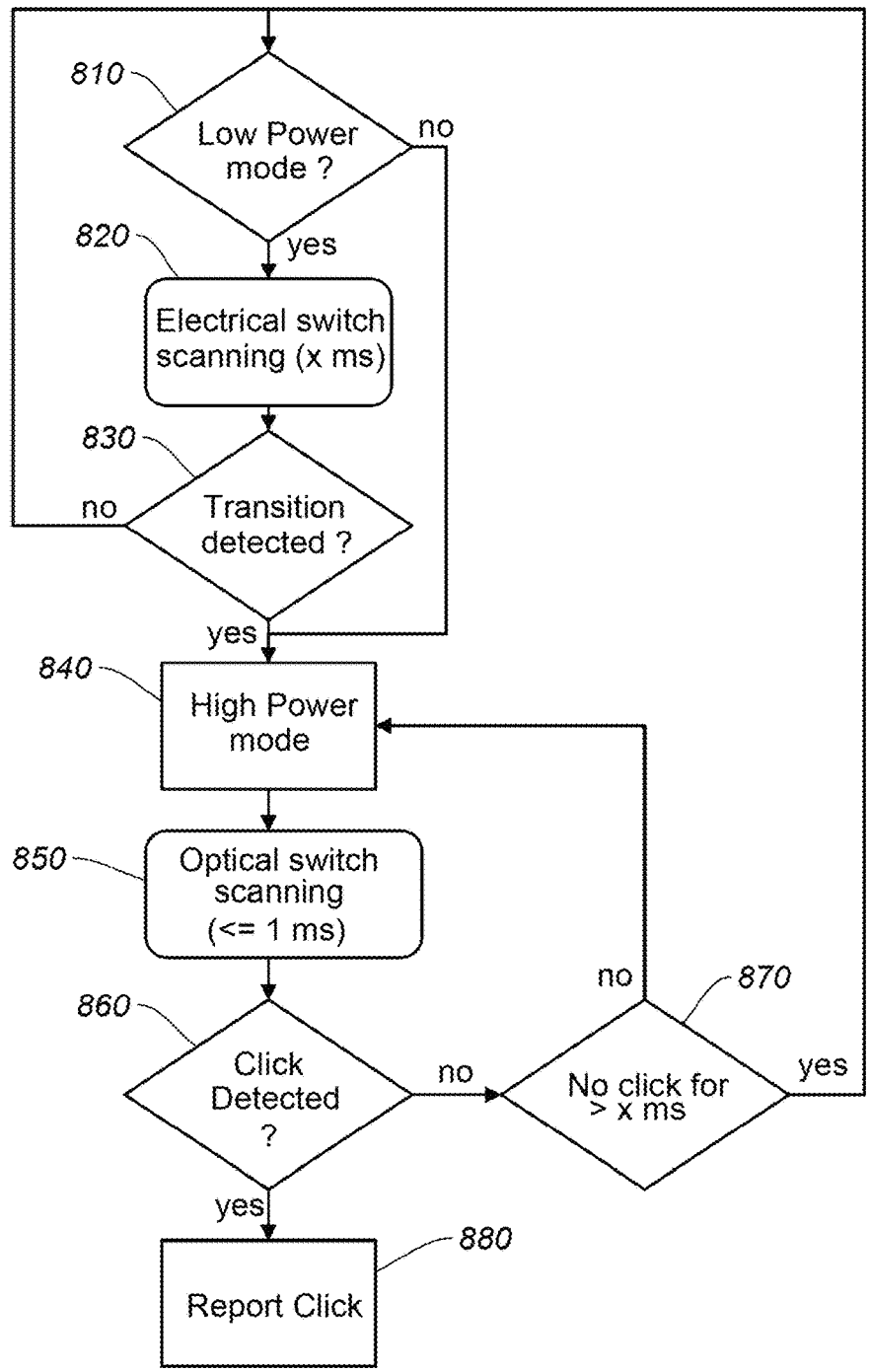
FIG. 8A is a flow chart showing how a hybrid switch implementation can be used for improved power efficiency in an input device, according to certain embodiments.

FIG. 8A is a simplified flow chart of a method 800 showing how a hybrid switch implementation can be used for improved power efficiency in an input device, according to certain embodiments. Method 800 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 800 can be performed by aspects of system 200, system 300, hybrid switch 600, circuit 700, or a combination thereof, as would be appreciated by one of ordinary skill in the art with the benefit of this disclosure.

At operation 810, method 800 can include detecting whether the input device is operating in a low power (sleep) mode, according to certain embodiments. At operation 820, method 800 can include scanning the contact-based switch (e.g., a first switch—electric/galvanic type) to determine if a transition is detected in response to detecting whether the input device is operating in the low power mode, according to certain embodiments. At operation 830, method 800 can include determining whether a transition is detected (e.g., whether the contact-based switch indicates a click, key press, or other event corresponding to contact 635 making electrical contact with rear electrical contact 640) based on the scanning of the contact-based switch, according to certain embodiments. When no transition is detected, method 800 returns to operation 810.

When a transition is detected or a low power mode is not detected at operation 810, method 800 can include causing the input device to switch to a high power active mode (operation 840), according to certain embodiments. In the high power active mode (operation 850), a second switch (optical switch) scans at a particular rate (e.g., preferably less than or equal to 1 ms) and if a click is detected (operation 860), a report click can be reported (operation 880), according to certain embodiments. If a click is not reported during the scan period, method 800 can include determining whether no click has occurred for a predetermined time (e.g., 1-10 s for performance modes, 100 ms in modes where latency is less important than power efficiency) (operation 870). If a click has been reported within the predetermined time period, then method 800 returns to operation 840 and the input device remains in the high power mode. If a click has not been reported within the predetermined time period, method 800 returns to the low power mode (operation 810).

It should be appreciated that the specific steps illustrated in FIG. 8A provide a particular method 800 for showing how a hybrid switch implementation can be used to improve power efficiency in an input device, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Furthermore, in certain embodiments of FIG. 8A, the method may operate as a "main loop" implementation running at a fixed period (e.g., 1 ms). However, in some cases, firmware may be partially or completely interrupt based, as presented in the embodiment of FIG. 8B below. In such cases, the system may wait for an interrupt from the contact-based switch which triggers the scanning of the contactless (e.g., optical) switch, which can confirm the click, report it to the host, and then stop. The next interrupt can be the release of the click (and seen by the contact switch), which again can be confirmed by the contactless switch, which can then go back to a "wait" mode. Some implementations may be configured to incorporate different aspects of both of these approaches (e.g., methods 800 and 890). For instance, the system can be in the interrupt mode (e.g., low power mode with higher latency) and in a "pulling" mode to guarantee a fixed and controlled latency. One of ordinary skill in the art with the benefit of this disclosure would appreciate the many modifications, variations, and alternative embodiments thereof.

Figure 8B:
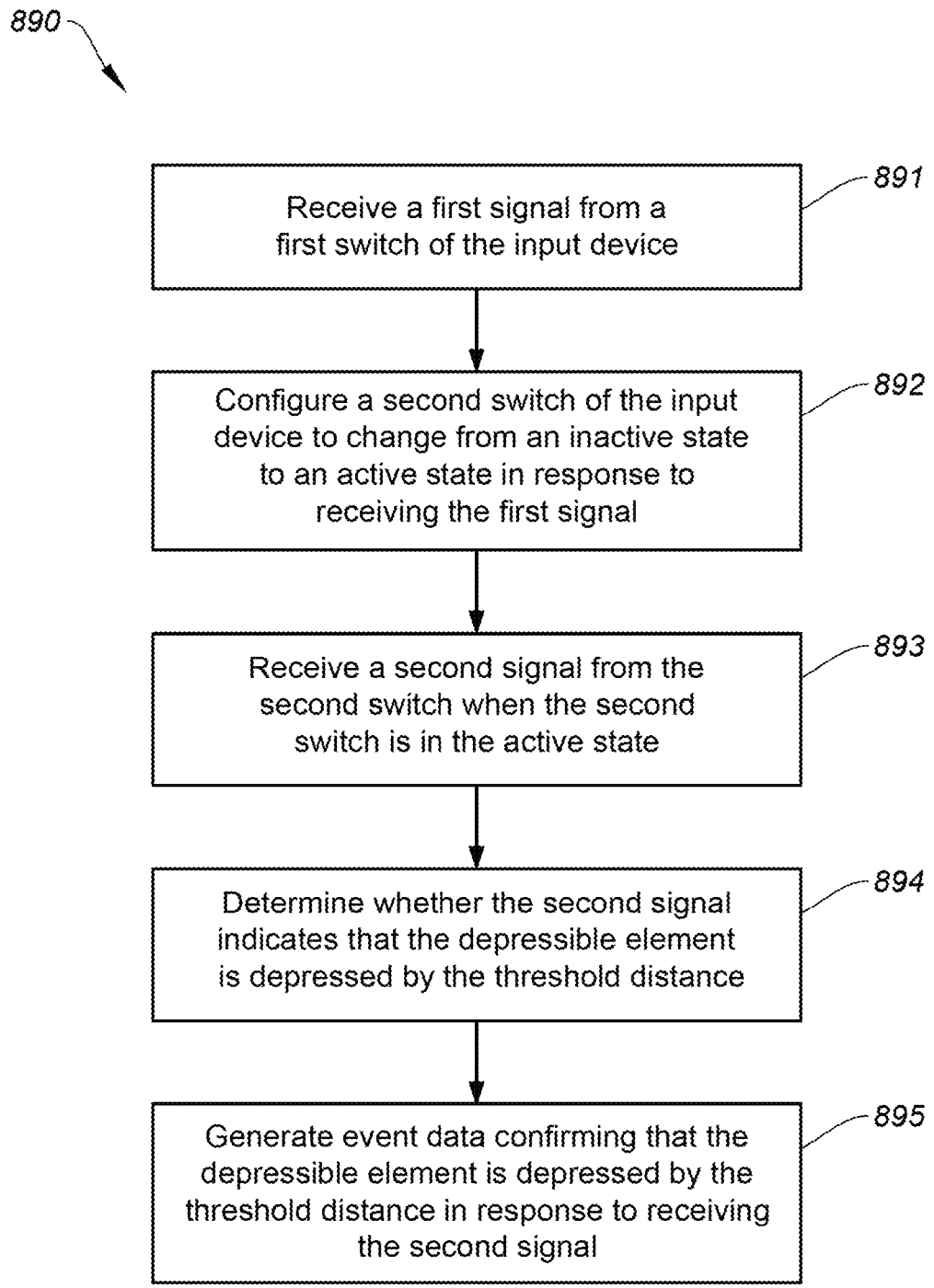
FIG. 8B is another flow chart showing how a hybrid switch implementation can be used for improved power efficiency in an input device, according to certain embodiments.

FIG. 8B is another simplified flow chart of a method 890 showing how a hybrid switch implementation can be used for improved power efficiency in an input device, according to certain embodiments. Method 890 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 890 can be performed by aspects of system 200, system 300, hybrid switch 600, circuit 700, or a combination thereof, as would be appreciated by one of ordinary skill in the art with the benefit of this disclosure.

At operation 891, method 800 can include receiving a first signal from a first switch of the input device, the first switch configured to generate the first signal when a depressible element of the input device is depressed by a threshold distance, according to certain embodiments. The first switch can be an electrical/galvanic contact-based switch. The input device can be a computer mouse where the depressible element is a button on the computer mouse, a keyboard where the depressible element is a key on the keyboard, or other suitable input device including medical devices, internet-of-things devices, gaming devices, home entertainment devices, fitness devices, or any suitable input device with input elements that can be configured to incorporate the myriad hybrid switch implementations described herein, including but not limited to the types of input devices described above (but not necessarily shown) with respect to FIG. 1.

At operation 892, method 800 can include configuring a second switch of the input device to change from an inactive state to an active state in response to receiving the first signal, according to certain embodiments. The second switch can be one of an optical, capacitive, inductive, piezo, or magnetic type contactless switch.

At operation 893, method 800 can include receiving a second signal from the second switch when the second switch is in the active state, the second signal indicating whether the depressible element is depressed by the threshold distance, according to certain embodiments.

At operation 894, method 800 can include determining whether the second signal indicates that the depressible element is depressed by the threshold distance, according to certain embodiments.

At operation 895, method 800 can include generating event data confirming that the depressible element is depressed by the threshold distance in response to receiving the second signal that indicates that the depressible element is depressed by the threshold distance, according to certain embodiments. In some aspects, the second switch is configured to change from an inactive state to an active state in response to receiving a first rising edge of the first signal. In some cases, when the second switch is in the active state, the second switch operates in a first power mode and the second switch is configured to continuously or intermittently detect whether the depressible element is depressed by the threshold distance. In some implementations, when the second switch is in the inactive state, the second switch operates in a second power mode and the second switch does not detect whether the depressible element is depressed by the threshold distance. Typically, the second switch consumes at least 50% more power when in the first power mode than when in the second power mode, and in many cases more than 90% more power. To put in context, an optical switch may operate in the range of 0.4 mW when active and operating (e.g., activated during a click) frequently, while a galvanic switch is typically around 20 μW. In some embodiments, when the second switch is in the active state, the second switch detects whether the depressible element is depressed by the threshold distance at a frequency of at least 1 kHz (checks every 1 ms or faster). In some cases, the second switch is in the inactive state by default until switched to the active state in response to receiving the first signal. In certain embodiments, the second switch switches from the active state to the inactive state after a threshold time of inactivity where the depressible element is not depressed.

It should be appreciated that the specific steps illustrated in FIG. 8B provide a particular method 890 for showing how a hybrid switch implementation can be used for improved power efficiency in an input device, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Latency Reduction in Device Reports

In a typical input device, such as a computer mouse, a click status may be checked at every embedded software main loop, as would be appreciated by one of ordinary skill in the art with the benefit of this disclosure. The loop is typically running at 1 kHz to match the communication protocol (e.g., USB or Logitech Unifying) at 1 ms per cycle or faster.

Figure 9A:
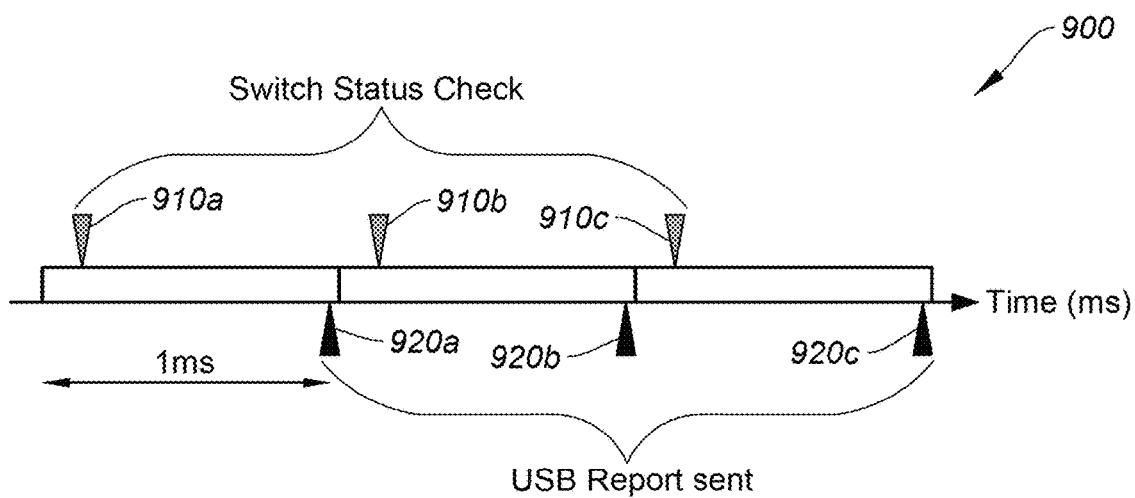
FIG. 9A is a simplified timing diagram showing aspects of how an input device performs certain status checks and device reports.
Figure 9B:
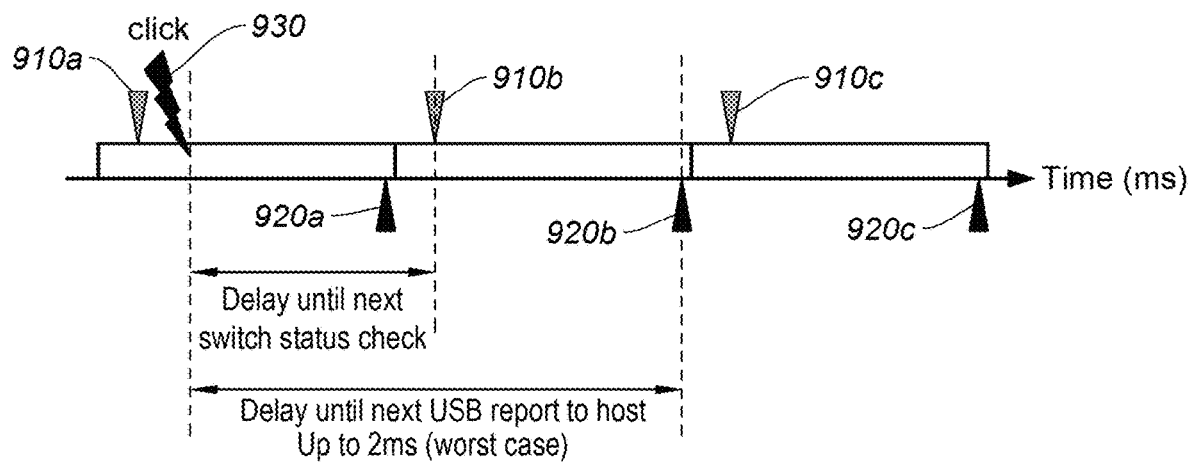
FIG. 9B is a simplified timing diagram showing aspects of how an input device performs certain status checks and device reports in response to an input.
Figure 9C:
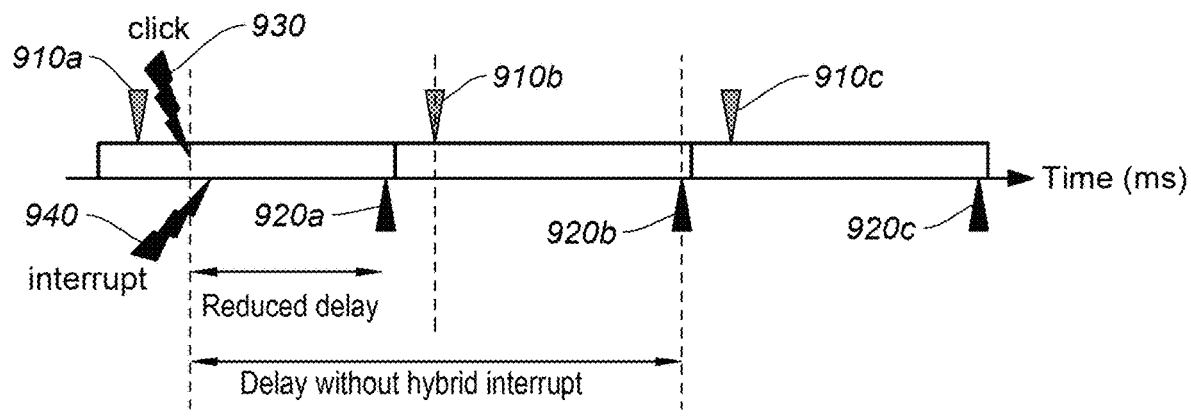
FIG. 9C is a simplified timing diagram showing aspects of how an input device with a hybrid switch performs certain status checks and device reports in response to an input, according to certain embodiments.

FIG. 9A is a simplified timing diagram showing aspects of how an input device performs certain status checks and device reports, according to certain embodiments. Each cycle is 1 ms (e.g., SW loop running at 1 kHz). Near the end of each cycle, a device report (e.g., 920*a-c*) is aggregated and sent to a remote host computing device is electronic communication with the input device (see, e.g., FIG. 1). The device report is sent near the end of each cycle to capture the majority of input device operations (e.g., button presses, movement detection, etc.) before sending the device report to the host computing device. A switch status check (e.g., 910*a-c*) may be performed near the beginning of the SW loop or at any other suitable timing arrangement. A physical button press or other event may span 10 ms or longer, so the switch status check 910 may capture the same button press over many subsequent SW loop cycles, according to certain embodiments. Referring to FIG. 9B, a click event 930 occurs during the first period, but after the switch status check 910*a*. As such, the input device may not be aware of the click until the next switch status check 910*b*, which occurs after the first device report is sent. In such cases, the click event may not be registered by the host computing device until up to 2 ms later (for click events occurring immediately after a switch status check) in a typical case of a 1 kHz report rate. A typical approach to limit this type of delay is to check the switch status at the end of the loop, just before the USB report. This may reduce the delay significantly, but often many activities within the input device may attempt to use this "last call" before the device report is sent, which may result in the switch status not always being included in the device report. In some embodiments, a hybrid switch architecture may allow for an additional interrupt signal to give the input device (processors 210) a notification, even if the switch was already checked (switch status check) that an event had or had not happened. In FIG. 9C, for instance, a click event 930 occurs after the switch status check 910*a*, however the additional switch signal (e.g., the first and/or second switch) can be used as an interrupt 940 to inform the processors 210 that a click event has occurred, which can help ensure that the click event is reported out on the first device report 920*a*, instead of waiting until the second device report 920*b* as would occur without the benefit of an interrupt.

Figure 9D:
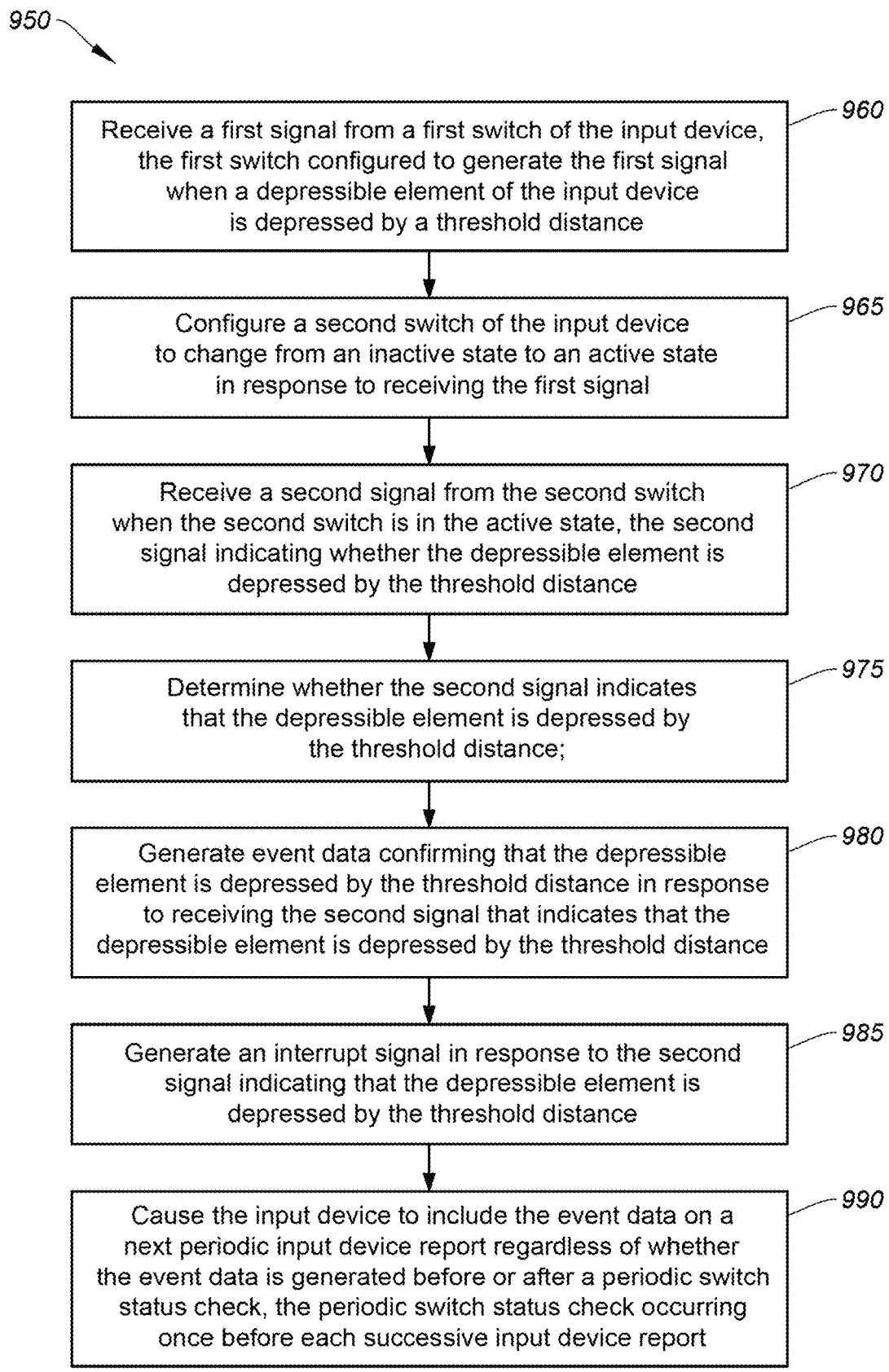
FIG. 9D is a simplified flow chart showing aspects of a method for efficiently reporting event data using a hybrid switch in an input device, according to certain embodiments.

FIG. 9D is a simplified flow chart showing aspects of a method 950 for efficiently reporting event data using a hybrid switch in an input device, according to certain embodiments. Method 950 can be performed by processing logic that may comprise hardware (e.g., circuitry, dedicated logic, etc.), software operating on appropriate hardware (such as a general purpose computing system or a dedicated machine), firmware (embedded software), or any combination thereof. In certain embodiments, method 950 can be performed by aspects of system 200, system 300, hybrid switch 600, or a combination thereof, as would be appreciated by one of ordinary skill in the art with the benefit of this disclosure.

At operation 960, method 950 can include receiving a first signal from a first switch of the input device, the first switch configured to generate the first signal when a depressible element of the input device is depressed by a threshold distance, according to certain embodiments. In some embodiments, the first switch can be a contact-based switch, such as an electric or galvanic contact-based switch. The input device can be a computer mouse where the depressible element is a button on the computer mouse, a keyboard where the depressible element is a key on the keyboard, or other suitable input device including medical devices, internet-of-things devices, gaming devices, home entertainment devices, fitness devices, or any suitable input device with input elements that can be configured to incorporate the myriad hybrid switch implementations described herein, including but not limited to the types of input devices described above (but not necessarily shown) with respect to FIG. 1.

At operation 965, method 950 can include configuring a second switch of the input device to change from an inactive state to an active state in response to receiving the first signal, according to certain embodiments. In some cases, the second switch can be one of an optical, capacitive, inductive, piezo, or magnetic contactless switch. Although many embodiments described herein include a hybrid switch with a contact-based switch and a contactless switch, it should be understood that some embodiments may employ two contact-based switches, two contactless switches, more than two switches, or any combination thereof, to implement the various novel concepts described in the present disclosure.

At operation 970, method 950 can include receiving a second signal from the second switch when the second switch is in the active state, the second signal indicating whether the depressible element is depressed by the threshold distance, according to certain embodiments.

At operation 975, method 950 can include determining whether the second signal indicates that the depressible element is depressed by the threshold distance, according to certain embodiments.

At operation 980, method 950 can include generating event data confirming that the depressible element is depressed by the threshold distance in response to receiving the second signal that indicates that the depressible element is depressed by the threshold distance, according to certain embodiments.

At operation 985, method 950 can include generating an interrupt signal in response to the second signal indicating that the depressible element is depressed by the threshold distance, according to certain embodiments.

At operation 990, method 950 can include in response to receiving the interrupt signal, causing the input device to include the event data on a next periodic input device report regardless of whether the event data is generated before or after a periodic switch status check, the periodic switch status check occurring once before each successive input device report, according to certain embodiments. In some embodiments, the second switch is configured to change from an inactive state to an active state in response to receiving a first rising edge of the first signal. The second switch may be in the inactive state by default until switched to the active state in response to receiving the first signal.

It should be appreciated that the specific steps illustrated in FIG. 9D provide a particular method 950 for efficiently reporting event data using a hybrid switch in an input device, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Preemptive Click with Sensor Fusion

In conventional input devices, when a user clicks a mouse or presses a keyboard key, the device "waits" until the user presses the button/key down to a certain activation threshold (activation point) to trigger the click event. The activation threshold is typically a design parameter of the switch. A design goal for many contemporary input device buttons/keys is to set the activation threshold at an early point the button is depressed, but not too early where the user cannot still "pull back" or partially press the button/key and release without instantiating a button/key press event. In other words, if the activation threshold is too early, the user may experience unintended clicks, and if it is too late, the user may lose some time (milliseconds) against their opponent, for instance, in competitive e-sports scenarios.

With the contactless switch (e.g., optical, magnetic (Hall Effect), inductive, capacitive, piezo, etc.), the output of the switch can be analog, as described above with respect to FIGS. 5A-5B. This means that the output is not only an ON/OFF status (see, e.g., FIG. 4A), but can provide some indication of how much the button was pressed (e.g., based on how much light 575 is detected by detector 580). Based on this fact, an earlier threshold could be set to be potentially faster than a contact-based switch and adjusted to avoid the non-ideal activation threshold setting described above. While this is theoretically possible with contactless switches, the activation threshold can be extremely difficult to set when accounting for environmental and production variations and tolerances between different contactless sensors, their arrangement and configuration within the input device, and the like. A gain, the hybrid provides additional information that allows this capability to be reliably mass produced.

FIG. 10A is a simplified timing diagram 1000 showing aspects of generating preemptive inputs on an input device using a hybrid switch, according to certain embodiments. The electrical signal from a contact-based switch can be used to enhance the benefits of the optical switch in hybrid switch embodiments. For instance, the electrical switch may be used to automatically calibrate the optical switch threshold, allowing for individual customization for a particular unit. Thus, the calibrated optical switch can now trigger before it would typically, which allows some delay/latency reduction. The preemptive click could even be a parameter set by the user based on his likings and his sensitivity to early detection/light pressing.

Referring back to FIG. 10A, the timing diagram 1000 shows a switch output for a contactless switch (e.g., an optical device) over time. During a click event, the optical analog output signal is indicative of a transition from a non-pressed state (e.g., barrier 510 is not obstructing light 525) with a maximum signal (e.g., Vcc) to a depressed state (e.g., barrier 510 is obstructing light 525) with a minimum signal (0 V or signal ground). As the optical barrier begins obstructing the light from the emitter, less light reaches the receiver (detector) and the output begins to reduce, as shown in FIG. 10A, which includes the optical analog signal, the electrical signal of the contact-based switch (e.g., first switch), a typical activation threshold for the contactless switch (e.g., the second switch). A preemptive click threshold and corresponding preemptive click signal can be set by using the contact-based switch as a calibration reference, as described above. As shown in FIG. 10A, the contactless switch can have a reliable preemptive click signal that can accommodate any manufacturing tolerances and variations due to this ability to calibrate relative to the contact-based switch.

In some embodiments that incorporate these calibration techniques, an input device (e.g., computer mouse or keyboard) can include one or more processors, a depressible element including two switches including a first switch (e.g., contact based switch) configured to generate a first signal when activated and a second switch (e.g., contactless switch) configured to generate a second signal when activated. The one or more processors can be communicatively coupled to the first switch and the second switch and may be configured to: receive the first signal from the first switch indicating that the first switch is activated in response to the depressible element being depressed by a threshold distance; determine a first position of the depressible element when the first signal is received, the first position of the depressible element corresponding to the threshold distance; calibrate a first activation threshold for the second switch based on the first position of the depressible element when the first signal is received, the first activation threshold causing the second switch to generate the second signal when the depressible element is depressed to the first position corresponding to the threshold distance; determine a second activation threshold for the second switch, the second activation threshold corresponding to a second position of the depressible element that causes the second switch to generate the second signal, wherein the second position is between the first position and a position of the depressible element when at rest and not being depressed; and cause the second switch to switch from the first activation threshold to the second activation threshold.

Figure 10B:
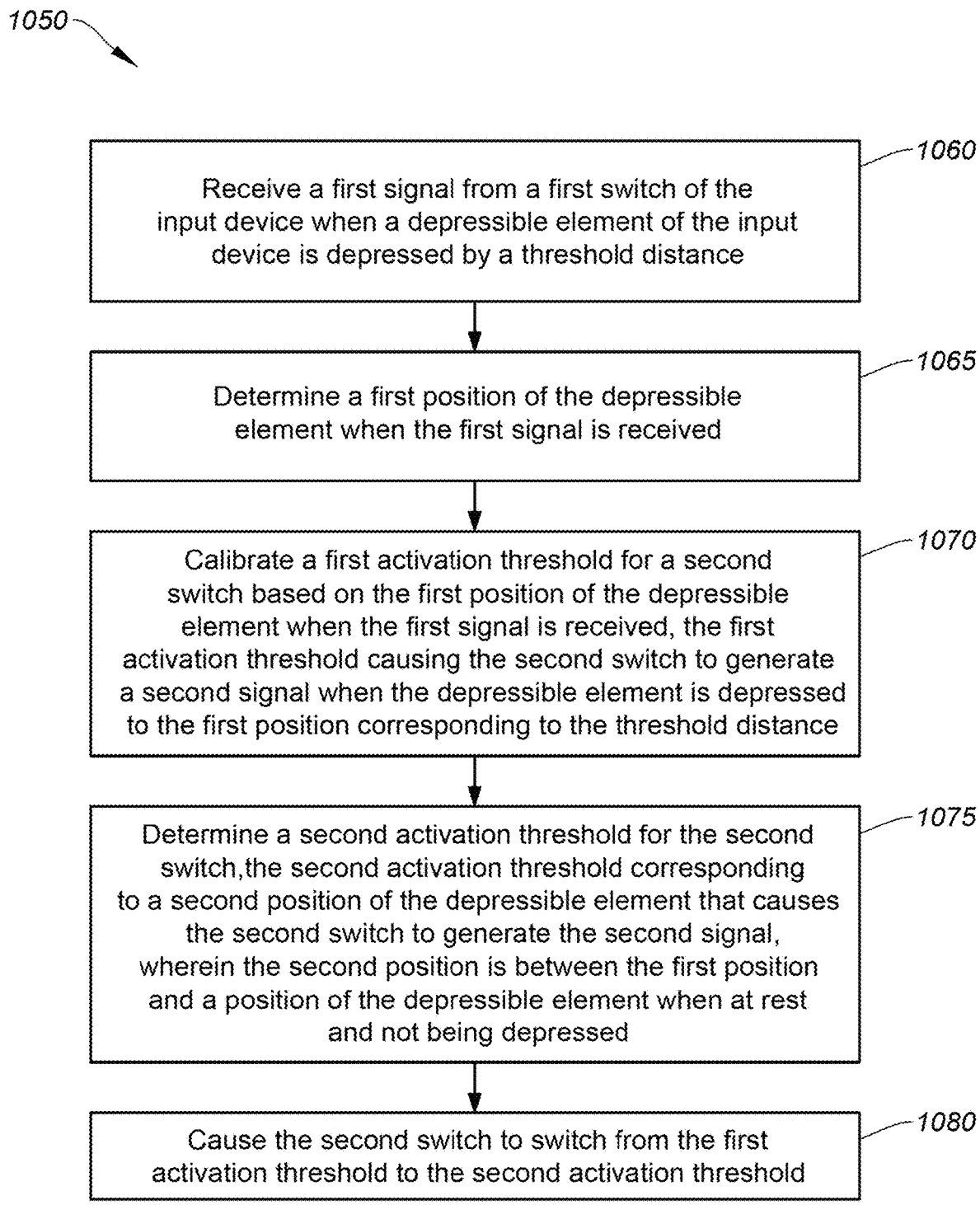
FIG. 10B is a simplified flow chart showing aspects of a method for generating preemptive inputs on an input device using a hybrid switch, according to certain embodiments.

FIG. 10B is a simplified flow chart showing aspects of a method 1050 for generating preemptive inputs on an input device using a hybrid switch, according to certain embodiments. Method 1050 can be performed by processing logic that may comprise hardware (e.g., circuitry, dedicated logic, etc.), software operating on appropriate hardware (such as a general purpose computing system or a dedicated machine), firmware (embedded software), or any combination thereof. In certain embodiments, method 1050 can be performed by aspects of system 200, system 300, hybrid switch 600, or a combination thereof, as would be appreciated by one of ordinary skill in the art with the benefit of this disclosure.

At operation 1060, method 1050 can include receiving a first signal from a first switch of the input device, the first switch configured to generate the first signal when a depressible element of the input device is depressed by a threshold distance, according to certain embodiments. The first switch can be an electric or galvanic contact-based switch. The input device can be a computer mouse where the depressible element is a button on the computer mouse, a keyboard where the depressible element is a key on the keyboard, or other suitable input device including medical devices, internet-of-things devices, gaming devices, home entertainment devices, fitness devices, or any suitable input device with input elements that can be configured to incorporate the myriad hybrid switch implementations described herein, including but not limited to the types of input devices described above (but not necessarily shown) with respect to FIG. 1.

At operation 1065, method 1050 can include determining a first position of the depressible element when the first signal is received, the first position of the depressible element corresponding to the threshold distance, according to certain embodiments.

At operation 1070, method 1050 can include calibrating a first activation threshold for a second switch based on the first position of the depressible element when the first signal is received, the first activation threshold causing the second switch to generate a second signal when the depressible element is depressed to the first position corresponding to the threshold distance, according to certain embodiments. In some cases, the second switch can be one of an optical, capacitive, inductive, piezo, or magnetic contactless switch. Although many embodiments described herein include a hybrid switch with a contact-based switch and a contactless switch, it should be understood that some embodiments may employ two contact-based switches, two contactless switches, more than two switches, or any combination thereof, to implement the various novel concepts described in the present disclosure.

At operation 1075, method 1050 can include determine a second activation threshold for the second switch, the second activation threshold corresponding to a second position of the depressible element that causes the second switch to generate the second signal, wherein the second position is between the first position and a position of the depressible element when at rest and not being depressed, according to certain embodiments.

At operation 1080, method 1050 can include cause the second switch to switch from the first activation threshold to the second activation threshold, according to certain embodiments. In some embodiments, method 1050 may further include receiving an input from a user corresponding to a selection of second activation threshold for the second switch, wherein the determining of the second activation threshold is based on the input from the user.

It should be appreciated that the specific steps illustrated in FIG. 10B provide a particular method 1050 for generating preemptive inputs on an input device using a hybrid switch, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Pre-Failure Detection and Self-Maintenance

In some cases, keyboards and mice are devices that often get used daily and sometimes more than 8 hours per day. The switches are some of the main interfaces with the user and may be some of the more fragile parts of the input device. For a pro gamer, changing their mouse/keyboard can be a difficult and challenging endeavor. As every device is slightly different than the next, a similar mouse model could have a slightly different response characteristic. Switching devices may require hundreds of additional hours of training to rebuild the user's muscle memory with the new input devices. When in a competitive environment, having to switch devices in the middle of a tournament could be a decision factor between winning and losing. Having an indicator that the mouse is at risk of failing ahead of the important event could be helpful to both the user and manufacturer and may be realized by using a simple correlation algorithm during the full length of the product between the electrical and the optical switch response. As described above, electrical contacts commonly wear out over time. In some optical designs, there can be some LED wear over time, however unlikely given their typical long product lives. By monitoring the behavior of the electrical signal around the optical feedback (e.g., bouncing increase or bouncing time or the delay between electrical and optical signals) and the behavior of the optical signal around the electrical feedback (e.g., increase/decrease of the optical signal voltage, delay between electrical and optical signals), some of these issues can be identified before a failure mode occurs.

Keyboard Implementations

Figure 12B:
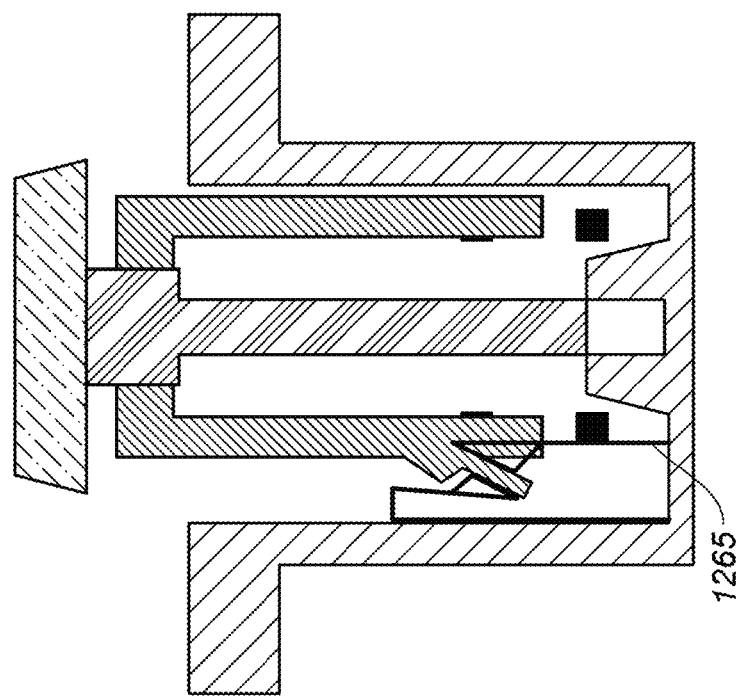
FIG. 12A-12B show a cross-section of a keyboard key implementation utilizing an inductive-based hybrid switch, according to certain embodiments.
Figure 12A:
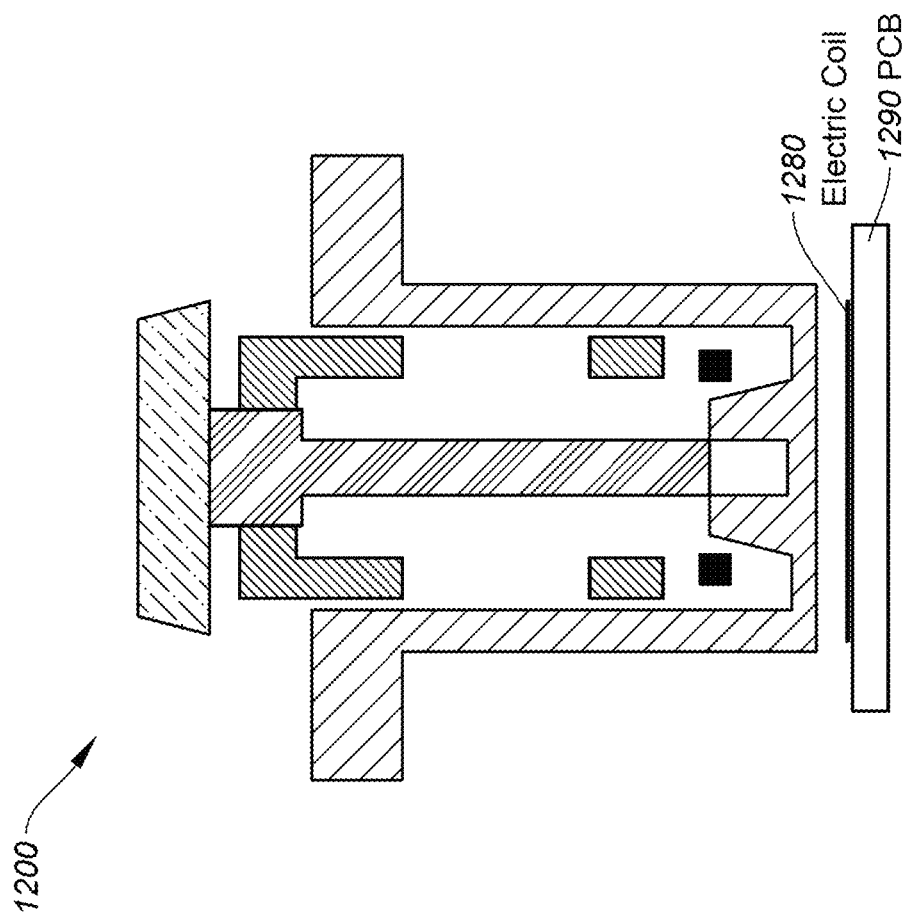

As described above, any of the hybrid switch implementations presented herein can be used on any suitable input device including computer mice, keyboards, game controllers, or the like. In some cases, a difference in design considerations between a keyboard and a computer mouse may be the number of switches used. The power consumption on a keyboard with optical switches on approximately 100 keys can be a significant part of the power budget of a keyboard design. A typical keyboard may use the keys as interrupt lines, and the keyboard may frequently go into a low power sleep mode for improved power efficiency. While this case save power, it can introduce unwanted latency when switching the keyboard back to an active state, as the various system and modules within the keyboard have to be powered back up. The use of a hybrid switch allows the keyboard to still go into a lower power mode and wait for an interrupt without having to have the entire device entire a sleep mode by keeping the optical devices in a low power state and checking the electrical contact to trigger the interrupt. Some typical designs for keyboard keys using an optical-based hybrid switch approach are shown in FIGS. 11A-11B. Keyboard keys using an inductive-based hybrid switch approach are shown in FIGS. 12A-12B. In each case (with both further described below), the keys include the contactless switch in one cross-section, and a typical "clicky" mechanical switch configured in another cross-section normal to the first cross section. In such cases, the haptic profile and electrical contact can be made using the same flexing blade, as shown in the figures.

FIGS. 11A and 11B show a hybrid key structure 1100, according to certain embodiments. Key structure 1100 can include a key cap 1110 and a stem 1120 coupled to the key cap and configured to be depressed relative to an upper frame 1105 in response to a user force, as a typical keyboard key structure would operate. Key cap 1110 typically is not fixedly integrated with the switch and can be snapped on the top of stem 1120. In some aspects, key cap 1110 may cause, in part, the "clicky" sound when the key cap is bottomed out and strikes frame 1105. Stem 1120 may be shaped in a variety of ways that affects the actuation and travel distance of the switch, and creates the keystroke feel and defines the switch type. In some aspects, stem 1120 can include a haptic and contact spacer portion 1150, which may provide a haptic response and separate contacts A and B when the switch is not closed (the key is not pressed by a threshold amount). Spring 1170 (e.g., coil spring or other suitable biasing mechanism) may have a resistance that can affect an amount of force needed to actuate the key and effectuate a click event, as well as provide a restoring force to guide the switch to slide back to an initial position. The base (bottom housing) 1108 may be coupled to upper housing 1105 (coupling not shown) and may attach to an underlying printed circuit board (PCB) or other suitable feature, as would be appreciated by one of ordinary skill in the art with the benefit of this disclosure. In operation, when a key is pressed beyond a threshold amount, a contact mechanism makes physical and electrical contact with the PCB and closes the switch circuit, thus rendering a key press or click event. In the embodiment shown, a contact mechanism may be comprised of two conductors (e.g., contacts A and B) that make contact when the key is in a neutral, non-pressed state. Thus, hybrid key structure 1100 may be in a normally closed state. The optical LED and phototransistor 1140 may also trigger a key press event in response to the key being depressed by the threshold amount. Note that any suitable contactless sensor can be used. For instance, in FIG. 12A-12B, as described above, shows an embodiment that utilizes an electric coil 1280 (e.g., realized as traces on a PCB 1290) that can perform inductive or capacitive sensing. One of ordinary skill in the art with the benefit of this disclosure would appreciate the many modifications, variations, and alternative embodiments thereof.

In a typical keyboard, the lines are connected to the processor (MCU) inputs, and the columns are driven one after the other (when one is driven, the other are in High impedance). Some implementations that can be used in a full hybrid keyboard can include: (1) LEDs are driven columns after columns and the phototransistor are read as lines; (2) LEDs are driven individually with a LED driver (same as for RGB keyboards) and phototransistors are regrouped; (3) Separated Optical and Electrical where optical is done using a typical scanning of the matrix and electrical contacts are connected together and used for interrupts; and (4) a Triangular matrix implementation.

Some embodiments may utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. F or example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. An input device comprising:
   one or more processors;
   a depressible element including two switches including:
      a first switch configured to generate a first signal when the depressible element is depressed by a threshold distance; and
      a second switch configured to generate a second signal indicating when the depressible element is depressed by the threshold distance and the second switch is in an active state,
   wherein the first switch and the second switch operate independently from one another, and wherein the one or more processors are communicatively coupled to the first switch and the second switch and are configured to:
receive the first signal from the first switch;
configure the second switch to change from an inactive state to an active state in response to receiving the first signal;
after the second switch is changed to the active state, receive the second signal from the second switch in the active state;
determine whether the second signal indicates that the depressible element is depressed by the threshold distance;
validate the first signal based on the second signal indicating that the depressible element is depressed by the threshold distance; and
generate event data confirming that the depressible element is depressed by the threshold distance in response to receiving the second signal validating the first signal and indicating that the depressible element is depressed by the threshold distance.

2. The input device of claim 1 wherein the first switch is an electric or galvanic contact-based switch.

3. The input device of claim 2 wherein the second switch is a contactless switch.

4. The input device of claim 3 wherein the second switch is one of an optical, capacitive, inductive, piezo, or magnetic contactless switch.

5. The input device of claim 1 wherein the second switch is configured to change from an inactive state to an active state in response to receiving a first rising edge of the first signal.

6. The input device of claim 1 wherein when the second switch is in the active state, the second switch operates in a first power mode and the second switch is configured to continuously or intermittently detect whether the depressible element is depressed by the threshold distance,
wherein when the second switch is in the inactive state, the second switch operates in a second power mode and the second switch does not detect whether the depressible element is depressed by the threshold distance, and
wherein the second switch consumes at least 90% more power when in the first power mode than when in the second power mode.

7. The input device of claim 6 wherein when in the active state, the second switch detects whether the depressible element is depressed by the threshold distance at a frequency of at least 1 kHz.

8. The input device of claim 6 wherein the second switch is in the inactive state by default until switched to the active state in response to the one or more processors receiving the first signal.

9. The input device of claim 6 wherein the one or more processors cause the second switch to switch from the active state to the inactive state after a threshold time of inactivity where the depressible element is not depressed.

10. The input device of claim 1 wherein the input device is a computer mouse, and wherein the depressible element is a button on the computer mouse.

11. The input device of claim 1 wherein the input device is a keyboard, and wherein the depressible element is a key on the keyboard.

12. A method of operating an input device, the method comprising:
receiving a first signal from a first switch of the input device, the first switch configured to generate the first signal when a depressible element of the input device is depressed by a threshold distance;
configuring a second switch of the input device to change from an inactive state to an active state in response to receiving the first signal, wherein the first switch operates independently from the second switch;
receiving a second signal from the second switch when the second switch is in the active state, the second signal indicating whether the depressible element is depressed by the threshold distance;
determining whether the second signal indicates that the depressible element is depressed by the threshold distance;
validating the first signal based on the second signal indicating that the depressible element is depressed by the threshold distance; and
generating event data confirming that the depressible element is depressed by the threshold distance in response to receiving the validation of the first signal and the second signal that indicates that the depressible element is depressed by the threshold distance.

13. The method of claim 12 wherein the first switch is an electric or galvanic contact-based switch.

14. The method of claim 13 wherein the second switch is one of an optical, capacitive, inductive, piezo, or magnetic contactless switch.

15. The method of claim 12 wherein the second switch is configured to change from an inactive state to an active state in response to receiving a first rising edge of the first signal.

16. The method of claim 12 wherein when the second switch is in the active state, the second switch operates in a first power mode and the second switch is configured to continuously or intermittently detect whether the depressible element is depressed by the threshold distance,
wherein when the second switch is in the inactive state, the second switch operates in a second power mode and the second switch does not detect whether the depressible element is depressed by the threshold distance, and
wherein the second switch consumes at least 90% more power when in the first power mode than when in the second power mode.

17. The method of claim 16 wherein when in the active state, the second switch detects whether the depressible element is depressed by the threshold distance at a frequency of at least 1 kHz.

18. The method of claim 16 wherein the second switch is in the inactive state by default until switched to the active state in response to receiving the first signal.

19. The method of claim 16 wherein the second switch switches from the active state to the inactive state after a threshold time of inactivity where the depressible element is not depressed.

20. The method of claim 12 wherein the input device is one of:
a computer mouse, wherein the depressible element is a button on the computer mouse; or
a keyboard, wherein the depressible element is a key on the keyboard.

* * * * *